(12) United States Patent
Miyazaki

(10) Patent No.: US 6,385,697 B1
(45) Date of Patent: May 7, 2002

(54) SYSTEM AND METHOD FOR CACHE PROCESS

(75) Inventor: Mitsuhiro Miyazaki, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/461,092

(22) Filed: Dec. 14, 1999

(30) Foreign Application Priority Data

Dec. 15, 1998 (JP) ............................. 10-356815

(51) Int. Cl.$^7$ ................................. G06F 12/00

(52) U.S. Cl. .................... 711/128; 711/163; 711/202

(58) Field of Search .................... 711/128, 163, 711/202, 3, 113, 118, 145

(56) References Cited

U.S. PATENT DOCUMENTS

| | | |
|---|---|---|
| 5,592,432 A | 1/1997 | Vishlitzky et al. |
| 5,822,759 A | 10/1998 | Treynor |
| 5,983,313 A | 11/1999 | Heisler et al. |

FOREIGN PATENT DOCUMENTS

| | | |
|---|---|---|
| JP | 61-241853 | 10/1986 |
| JP | 5-73415 | 3/1993 |
| JP | 6-12323 | 1/1994 |
| JP | 6-250926 | 9/1994 |

OTHER PUBLICATIONS

Jouppi. N. P., "Improving direct–mapped cache performance by the addition of a small fully–associative cache and–prefetch buffers", Proceedings of the 17$^{th}$ Annual Interna tional Symposium on Computer Architecture, May 28–31, 1990, pp. 364–373.

"Cache data update to MRU" *IBM Technical Disclosure Bulletin*, vol. 29, No. 10, Mar. 1987.

*Patent Abstracts of Japan*, vol. 1998, No. 7, Publication No. 09–190382, Publication Date Jul. 22, 1997.

*Primary Examiner*—Matthew Kim
*Assistant Examiner*—Fred F. Tzeng
(74) *Attorney, Agent, or Firm*—Whitham, Curtis & Christofferson P.C.

(57) ABSTRACT

In a cache system, a non-FSA (Full-Set Associative) cash table such as a DM (Direct Mapping) cache table is coupled with an FSA cache table. Tag comparison for cache hit judgment is executed simultaneously in the two cache tables. The number of cache hits to each cache line of the FSA cache table is counted by an access counter, and an access count value concerning the cache hit count is stored in an access count area of each cache line. When a cache hit occurred to a cache line of the FSA cache table, the access count value of the cache line is incremented by 1. When a miss hit occurred to both cache tables, the access count values of all the cache lines of the FSA cache table are decremented by 1 at once. If miss hits occurred to both cache tables when the DM cache table has an invalid cache line corresponding to the index of input address data, data fetched from main memory due to the miss hits is written into the invalid cache line corresponding to the index. If the miss hits occurred when the DM cache table has no invalid cache line corresponding to the index and the FSA cache table is full of valid cache lines, data stored in the miss hit cache line of the DM cache table is transferred to one of cache lines of the FSA cache table having the smallest access count value, and data fetched from the main memory is written into the miss hit cache line of the DM cache table. By such data management/transfer, the cache hit rate and data access speed are increased to higher levels.

30 Claims, 13 Drawing Sheets

FIG. 2
PRIOR ART

| ADDRESS | INSTRUCTION | |
|---------|-------------|---|
| 0 0 0 0 0 0 4 0 | (1) | |
| 0 0 0 0 0 0 4 4 | (2) | |
| 0 0 0 0 0 0 4 8 | (3) | |
| 0 0 0 0 0 0 4 C | (4) | MAIN ROUTINE |
| 0 0 0 0 1 0 3 0 | | |
| 0 0 0 0 1 0 3 C | | |
| 0 0 0 0 1 0 4 0 | (5) | |
| 0 0 0 0 1 0 4 C | | |

FIG. 3A
PRIOR ART

DIRECT MAPPING CACHE AFTER EXECUTION OF INSTRUCTION (1)

| | V | TAG | DATA |
|---|---|---|---|
| INDEX: 00 | 1 | xxxxx | xxxxxxxxxxxxxxx |
| INDEX: 01 | 1 | xxxxx | xxxxxxxxxxxxxxx |
| INDEX: 02 | 1 | xxxxx | xxxxxxxxxxxxxxx |
| INDEX: 03 | 1 | xxxxx | xxxxxxxxxxxxxxx |
| INDEX: 04 | 1 | 00000 | xxxxxxxxxxxxxxx |
| | ----- | ----- | ----- |
| | 1 | xxxxx | xxxxxxxxxxxxxxx |
| | 1 | xxxxx | xxxxxxxxxxxxxxx |

FIG. 3B
PRIOR ART

DIRECT MAPPING CACHE AFTER EXECUTION OF INSTRUCTION (5)

| | V | TAG | DATA |
|---|---|---|---|
| INDEX: 00 | 1 | xxxxx | xxxxxxxxxxxxxxx |
| INDEX: 01 | 1 | xxxxx | xxxxxxxxxxxxxxx |
| INDEX: 02 | 1 | xxxxx | xxxxxxxxxxxxxxx |
| INDEX: 03 | 1 | xxxxx | xxxxxxxxxxxxxxx |
| INDEX: 04 | 1 | 00001 | xxxxxxxxxxxxxxx |
| | ----- | ----- | ----- |
| | 1 | xxxxx | xxxxxxxxxxxxxxx |
| | 1 | xxxxx | xxxxxxxxxxxxxxx |

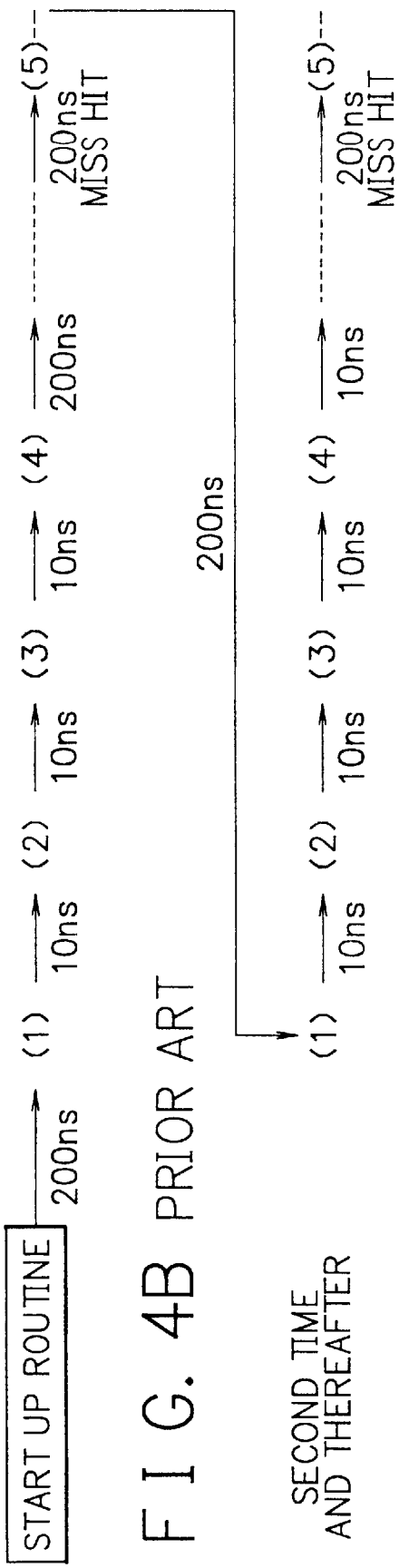

FIG. 8

| ADDRESS | INSTRUCTION | |
|---|---|---|
| 0 0 0 0 0 0 4 0 | (1) | |
| 0 0 0 0 0 0 4 4 | (2) | |
| 0 0 0 0 0 0 4 8 | (3) | |
| 0 0 0 0 0 0 4 C | (4) | MAIN ROUTINE |
| 0 0 0 0 1 0 3 0 | | |
| 0 0 0 0 1 0 3 C | | |
| 0 0 0 0 1 0 4 0 | (5) | |
| 0 0 0 0 1 0 4 C | | |

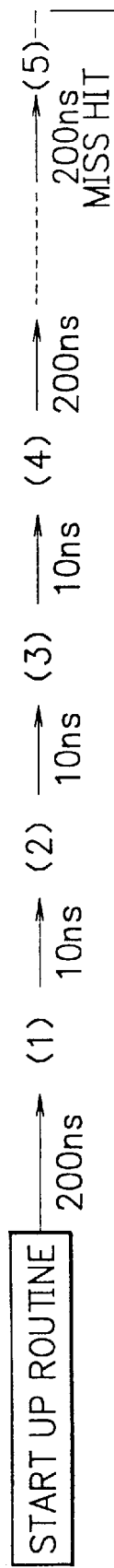
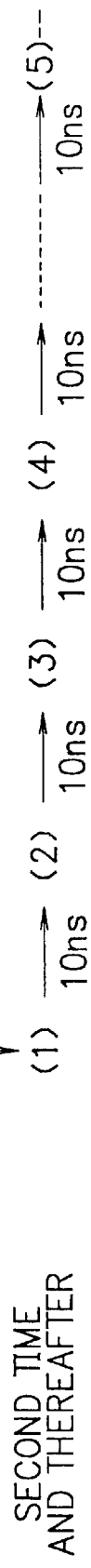
F I G. 9A  FIRST TIME
F I G. 9B  SECOND TIME AND THEREAFTER
MAIN MEMORY ACCESS    200ns=100ns+30ns+30ns+30ns+10ns
CACHE ACCESS    10ns

F I G. 10

FSA CACHE TABLE TA

| V1 | TAG #1 | DATA | AC |
|---|---|---|---|
| 1 | 0000004 | xxxxxxxxxxxx | 0 |
|  |  |  |  |
|  |  |  |  |
| ----- | ----- | ----- | ----- |
|  |  |  |  |

DM CACHE TABLE TB

| | V2 | TAG #2 | DATA |
|---|---|---|---|
| INDEX:00 | 1 | xxxxx | xxxxxxxxxxxxxx |
| INDEX:01 | 1 | xxxxx | xxxxxxxxxxxxxx |
| INDEX:02 | 1 | xxxxx | xxxxxxxxxxxxxx |
| INDEX:03 | 1 | xxxxx | xxxxxxxxxxxxxx |
| INDEX:04 | 1 | 00001 | xxxxxxxxxxxxxx |
| | ----- | ----- | ----- |
| | 1 | xxxxx | xxxxxxxxxxxxxx |
| | 1 | xxxxx | xxxxxxxxxxxxxx |

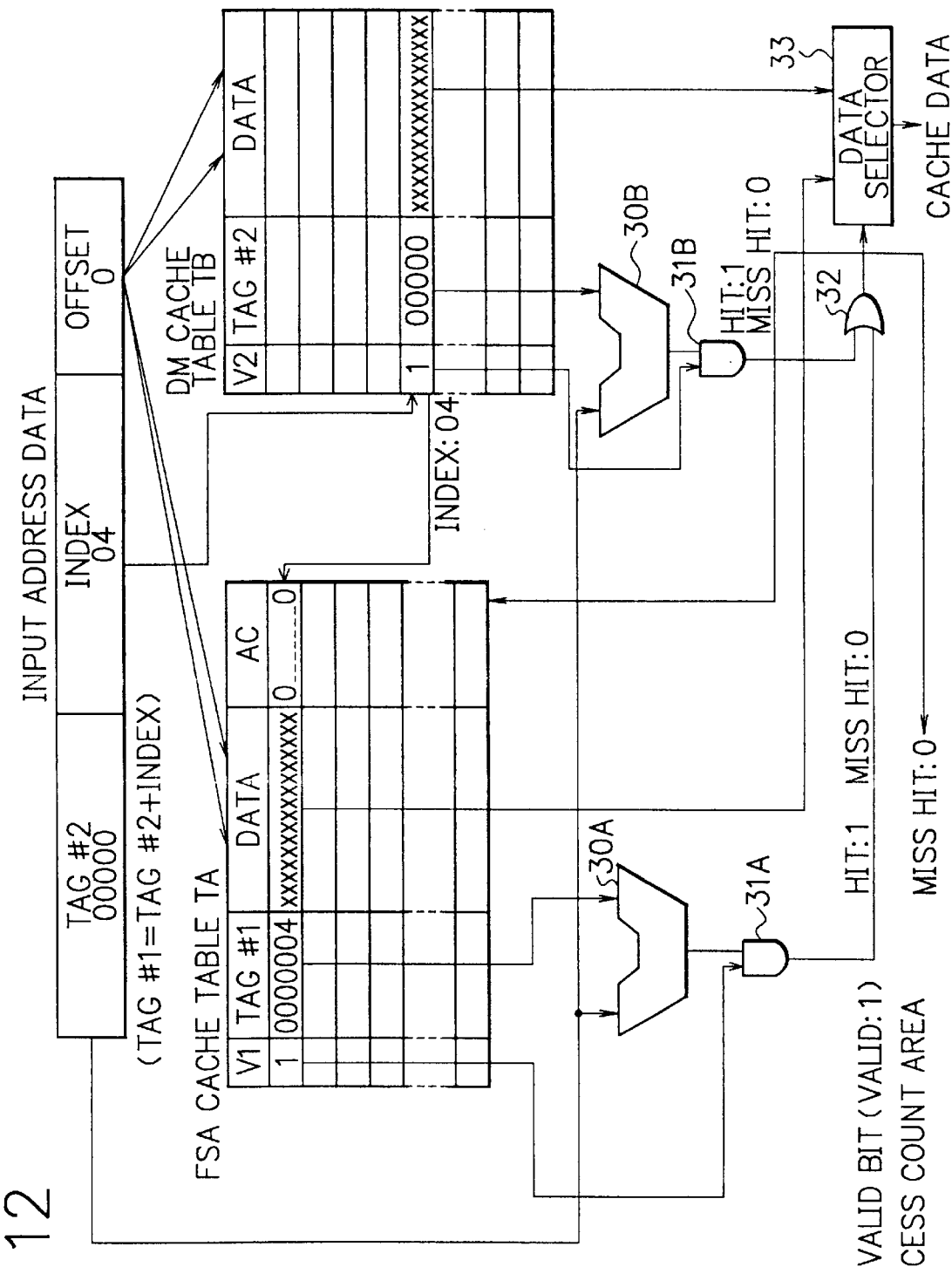
F I G. 12

FIG. 13

4-WAY SET ASSOCIATIVE CACHE TABLE TC

| LRU | V2 | TAG #2 | DATA | V2 | TAG #2 | DATA | V2 | TAG #2 | DATA | V2 | TAG #2 | DATA |
|---|---|---|---|---|---|---|---|---|---|---|---|---|
| | | | | | | | | | | | | |
| | | | | | | | | | | | | |
| | | | | | | | | | | | | |
| | | | | | | | | | | | | |
| | | | | | | | | | | | | |

US 6,385,697 B1

SYSTEM AND METHOD FOR CACHE PROCESS

BACKGROUND OF THE INVENTION

The present invention relates to a cache system and a cache processing method to be applied to a data processing unit such as an MPU (MicroProcessor Unit), a CPU (Central Processing Unit), etc. for reducing access time to external memory such as main memory, and in particular, to a cache system and a cache processing method in which full-set associative cash memory capable of preserving cache lines of high usage frequencies is coupled with non-full-set associative cash memory (direct mapping cache memory, 2-way set associative cache memory, 4-way set associative cache memory, 8-way set associative cache memory, etc.) and thereby the cache hit rate is increased.

DESCRIPTION OF THE PRIOR ART

Cache or cache memory is widely used for reducing access time of an MPU, a CPU, etc. of high data processing speed to memory of low data processing speed such as main memory. Especially, hierarchical cache memory composed of a primary cache memory and a secondary cache memory is widely used in order to increase program execution speed of the MPU, CPU, etc. and thereby improve throughput of systems including the MPU, CPU, etc. Generally, cache memory is provided with a cache table for storing a plurality of tags and data corresponding to the tags. A tag extracted from input address data is compared with tags which have been stored in the cache table, and if the extracted tag matched one of the stored tags, data corresponding to the matched tag is selected out and outputted from the cache table to the MPU, CPU, etc. Thereby, the number of access to external memory (such as main memory of low data processing speed) is reduced, and thereby high speed data processing of the MPU, CPU, etc. is realized.

As the cache memory, full-set associative cash memory and direct mapping cache memory are well known. The direct mapping cache memory can implement high speed access with a small circuit scale, however, its cache hit rate is easily deteriorated. On the other hand, the full-set associative cash memory requires more complicated circuit composition and larger power consumption, however, preservation of high-hit-rate cache lines is possible in the full-set associative cash memory. Incidentally, 2-way set associative cache memory, 4-way set associative cache memory and 8-way set associative cache memory are also well known as non-full-set associative cache memories having similar functions to the direct mapping cache memory.

FIG. 1 is a schematic block diagram showing typical conventional direct mapping cache memory. The direct mapping cache memory shown in FIG. 1 includes a cache table 801 for storing a plurality of tags and data corresponding to the tags, a comparator 802, an AND gate 803 and a data selector 804. Each cache line of the cache table 801 is also provided with a "valid bit" for indicating whether the cache line is valid or invalid. A valid bit "1" indicates that the cache line is valid, and a valid bit "0" indicates that the cache line is invalid. At the top of FIG. 1, an example of an input address data "00000040" (hex) is shown. The input address data includes a tag, an index and an offset. In the case of the input address data "00000040", the tag is "00000" (the front 5 hexadecimal digits of the input address data, for example), the index is "04" (the next 2 hexadecimal digits of the input address data, for example), and the offset is "0" (the last 1 hexadecimal digit of the input address data, for example).

FIG. 2 is a schematic diagram showing an example of a program which is executed by a CPU. Referring to FIG. 2, the program includes instructions (1), (2), . . . to be executed. The main memory preliminarily stores a plurality of instructions in its corresponding addresses. When the program of FIG. 2 is executed by the CPU, the CPU first refers to input address data (which is supplied from a program counter) with regard to the first instruction (1) of the program. The input address data "00000040" with regard to the first instruction (1) indicates that the first instruction (1) has preliminarily been stored in an address "00000040" of the main memory. With regard to the first instruction (1), the CPU (concretely, the comparator 802 of the direct mapping cache memory shown in FIG. 1) judges whether the tag "00000" extracted from the input address data "00000040" matches a tag which have been stored in a cache line (of the cache table 801 shown in FIG. 1.) corresponding to the index "04". If matched, data corresponding to the matched tag is read out from the cache table 801 of the direct mapping cache memory and sent to the CPU (instruction decoder). If not matched, the CPU makes access to the main memory and fetches the first instruction (1) from the address "00000040" of the main memory. In this case (not matched), the cache line corresponding to the index "04" is rewritten, that is, the data of the cache line corresponding to the index "04" is changed into the data fetched from the main memory and the tag of the cache line is changed into the tag "00000" corresponding to the input address data "00000040". Thereafter, the same processes are executed for the subsequent instructions (2), (3), . . . . By use of the direct mapping cache memory, the number of access of the CPU to the main memory (needing long access time) is reduced, and thereby high speed program execution by the CPU (cache process) is realized.

FIGS. 3A and 3B are schematic diagrams showing examples of change of statuses of the cache table 801 of the direct mapping cache memory of FIG. 1 when the program of FIG. 2 is executed by the CPU, in which FIG. 3A shows the status of the cache table 801 just after the execution of the instruction (1) of FIG. 2 by the CPU and FIG. 3B shows the status of the cache table 801 just after the execution of the instruction (5) of FIG. 2 by the CPU. Referring to FIG. 3A, at the point when the instruction (1) has just been executed, a cache line of the cache table 801 corresponding to an index "04" stores a tag "00000" (corresponding to the input address data "00000040") and data corresponding to the tag "00000". Referring to FIG. 3B, at the point when the instruction (5) has just been executed, the same cache line of the cache table 801 corresponding to the index "04" stores a tag "00001" (corresponding to the input address data "00001040") and data corresponding to the tag "00001".

FIGS. 4A and 4B are schematic diagrams showing access time of the CPU employing the direct mapping cache memory when the program of FIG. 2 is executed twice, in which FIG. 4A shows a case where the program of FIG. 2 is executed for the first time and FIG. 4B shows a case where the program of FIG. 2 is executed for the second time. Incidentally, the following explanation concerning program execution time will be given on the assumption that the length of a data storage area of each cache line of the direct mapping cache memory is 4 words (16 bytes) and the length of each instruction of the program of FIG. 2 is 1 word (4 bytes) (that is, on the assumption that 4 instructions are stored in the data storage area of each cache line of the direct mapping cache memory). Access time necessary for fetching data (instruction) from the main memory is assumed to be 100 ns for the first word, and 30 ns for each of the following 3 words. Therefore, access time necessary for fetching data of 4 words (4 instructions) from the main memory and storing the data in a cache line of the direct mapping cache memory becomes 100+30+30+30=190 ns. If we assume the CPU takes 10 ns for reading and executing an instruction which has just been stored in the cache line of the direct mapping cache memory, access time necessary for fetching first 4 words of data (first 4 instructions) from the CPU, storing the data in the direct mapping cache memory and executing the stored first instruction (1) becomes 190+10=200 ns.

In the initialization, all the cache lines of the direct mapping cache memory are set invalid, that is, all the valid bits V of the cache lines are set to "0". Just after the initialization, no data substantially exists in the direct mapping cache memory since the valid bits V are all "0". Therefore, the CPU fetches necessary data (instructions (1) through (4) corresponding to the first index "04" of the program of FIG. 2) from the main memory, and writes the fetched instructions (1) through (4) in a cache line of the direct mapping cache memory corresponding to the index "04". By the data writing, the cache line of the direct mapping cache memory corresponding to the index "04" is turned valid, that is, the valid bit V of the cache line is set to "1" (see FIG. 1). Thereafter, the CPU reads the first instruction (1) from the cache line of the direct mapping cache memory and executes the instruction (1). In the first program execution shown in FIG. 4A, it takes 100+30+30+30+10=200 ns for the CPU to execute the first instruction (1) after a start up routine. Each of the following instructions (2), (3) and (4) takes 10 ns to be executed, respectively (30 ns). Thereafter, the following four instructions corresponding to addresses 00001030 through 0000103C are executed by the CPU in the same way (200+10+10+10=230 ns).

When the instruction (5) shown in FIG. 2 (corresponding to the aforementioned index "04") is to be executed by the CPU, the instruction (1) and the tag (00000) corresponding to the instruction (1) have already been stored in the cache line of the direct mapping cache memory corresponding to the index "04". Therefore, a miss hit (00001≠00000) occurs in the cache line of the direct mapping cache memory corresponding to the index "04". Therefore, the CPU fetches the instruction (5) from the main memory and stores the instruction (5) and a corresponding tag (00001) in the cache line corresponding to the index "04". Due to the miss hit, the execution of the instruction (5) also takes 100+30+30+30+10=200 ns. Each of the following three instructions takes 10 ns to be executed, respectively. Therefore, total program execution time in the first program execution becomes 230×3=690 ns.

At the point when the first program execution shown in FIG. 4A is finished, the cache line corresponding to the index "04" stores the tag "00001" corresponding to the instruction (5) as shown in FIG. 3B. Therefore, when the instruction (1) (corresponding to the aforementioned index "04") is to be executed by the CPU in the second program execution, a miss hit (00000≠00001) occurs again to the cache line corresponding to the index "04", thereby the CPU fetches the instruction (1) from the main memory again, and thus the instruction (1) in the second program execution takes 200 ns to be executed. Each of the following instructions (2), (3) and (4) takes 10 ns to be executed, respectively (30 ns). Thereafter, the following four instructions corresponding to addresses 00001030 through 0000103C are executed by the CPU using cache data which have already been stored in a cache line of the direct mapping cache memory corresponding to the index "03" (10+10+10+10=40 ns). Thereafter, when the instruction (5) (corresponding to the aforementioned index "04") is to be executed by the CPU in the second program execution, a miss hit (00001≠00000) occurs again to the cache line corresponding to the index "04" in similar manner (200 ns). Each of the following three instructions takes 10 ns to be executed, respectively (30 ns). Therefore, total program execution time in the second program execution becomes 230+40+230=500 ns. Therefore, total execution time for executing the program of FIG. 2 twice becomes 690+500=1190 ns.

As shown above, cache misses (miss hits) occur easily and frequently in the direct mapping cache memory though the direct mapping cache memory can implement high speed access with a small circuit scale. The access to the main memory due to the cache miss takes as long as 200 ns for example, and thus the program execution time of the CPU (the access time of the CPU for executing a program) is necessitated to be long.

In order to improve the cache hit rate and reduce the memory access time and the program execution time, hierarchical cache memory composed of a primary cache memory and a secondary cache memory is widely used. In a "cache memory control method" disclosed in Japanese Patent Application Laid-Open No.SHO61-241853 for example, a primary cache memory is provided between the CPU and the main memory, and a secondary cache memory is provided between the primary cache memory and the main memory. In the case where a cache hit occurred to the primary cache memory, necessary data which has been stored in the primary cache memory is supplied to the CPU as cache data. In the case where a miss hit occurred to the primary cache memory and a cache hit occurred to the secondary cache memory, necessary data which has been stored in the secondary cache memory is transferred to the primary cache memory, and the necessary data is supplied to the CPU. In this case, if there is no invalid (unused) cache line (to which the necessary data from the secondary cache memory can be transferred) in the primary cache memory, data which has been stored in a cache line of the primary cache memory is eliminated from the primary cache memory and transferred to a cache line of the secondary cache memory. In this case, if there is no invalid (unused) cache line (in which the data eliminated from the primary cache memory can be stored) in the secondary cache memory, data which has been stored in a cache line of the secondary cache memory is eliminated from the secondary cache memory (deleted) so that the data eliminated from the primary cache memory can be stored in the cache line of the secondary cache memory. In the case where miss hits occurred to both the primary cache memory and the secondary cache memory, the necessary data is fetched from the main memory and is written into the primary cache memory (The fetched data is not written into the secondary cache memory.), while the fetched data is generally written into both the primary cache memory and the secondary cache memory in ordinary hierarchical cache memory. By such operations, the cache hit rate of the secondary cache memory is improved.

In a conventional "hierarchical cache system" which has been disclosed in Japanese Patent Application Laid-Open No.HEI5-73415, the CPU judges whether or not necessary data exists in the primary cache memory or in the secondary cache memory. When the necessary data is not found in the primary cache memory and found in the secondary cache memory, the data found in the secondary cache memory is transferred to the primary cache memory. In this process, data which is eliminated from the primary cache memory is transferred to the secondary cache memory.

A conventional "cache memory system" which has been disclosed in Japanese Patent Application Laid-Open No.HEI6-012323 employs direct mapping cache memory for the primary cache memory and full-set associative cache memory for the secondary cache memory. The tag comparison for the judgment on the cache hit is executed simultaneously in the primary cache memory and the secondary cache memory. Data which is fetched from the main memory is written into both the primary cache memory and the secondary cache memory according to conventional techniques of the hierarchical cache memory. In the document, a counter for counting the number of access to each cache line of the secondary cache memory (the full-set associative cache memory) is proposed. When the counter of a cache line exceeded a preset value, the cache line is loaded onto the primary cache memory (the direct mapping cache memory) for subsequent access.

In a conventional "data processing system employing hierarchical cache memory" which has been disclosed in Japanese Patent Application Laid-Open No.HEI6-250926, when a miss hit (cache miss) occurred to the primary cache memory, the secondary cache memory is made access to. If a cache hit occurred to the secondary cache memory, the necessary data stored in the secondary cache memory is transferred to the primary cache memory (invalidated in the secondary cache memory) and supplied to the CPU. If a miss hit occurred also to the secondary cache memory, the main memory is made access to and necessary data is fetched from the main memory. In an embodiment of the document, data fetched from the main memory is transferred and registered in the primary cache memory only (not registered in the secondary cache memory) if the primary cache memory has enough memory space. If the primary cache memory does not have enough memory space, the data fetched from the main memory is registered in the secondary cache memory only (not registered in the primary cache memory). In another embodiment of the document, the data fetched from the main memory is directly registered in the primary cache memory only (not registered in the secondary cache memory). If data that can not be registered in the primary cache memory occurred in the direct data registration from the main memory to the primary cache memory, the data is transferred from the primary cache memory and registered in the secondary cache memory.

As described above, in the conventional direct mapping cache memory, preservation of high-hit-rate cache lines is impossible. The direct mapping cache memory can store only one cache line with respect to a particular index, and thus miss hits occur frequently and repeatedly and thereby the number of access to the main memory is necessitated to be large.

The cache hit rate could be improved by employing the hierarchical cache memory including the primary cache memory and the secondary cache memory. However, access to the secondary cache memory generally takes extra access time and thereby program execution time of the data processing unit such as the CPU is necessitated to be longer. There has been a conventional hierarchical cache memory which executes the tag comparison simultaneously in the primary cache memory (direct mapping cache memory) and the secondary cache memory (full-set associative cash memory). However, there remains plenty of room for improvement in the preservation of high-hit-rate cache lines in the full-set associative cash memory. Further, there are cases where particular data (the same data) is stored both in the direct mapping cache memory and in the full-set associative cash memory, thereby the usage efficiency of memory space of the cache memory is deteriorated and the amount of cache data which can be stored in the cache memory is reduced, and thus the cache hit rate can not be increased to the maximum.

SUMMARY OF THE INVENTION

It is therefore the primary object of the present invention to provide a cache system and a cache processing method, by which both high speed data access and a high cache hit rate are realized in high levels by coupling full-set associative cash memory and non-full-set associative cash memory together, and by improving the capability of preserving high-hit-rate cache lines of the cache system and by raising the usage efficiency of memory space of the cache system, and thereby the number of access of the data processing unit such as a CPU, an MPU, etc. to external memory such as main memory and data access time of the data processing unit can be reduced to minimum.

In accordance with a first aspect of the present invention, there is provided a cache system for decreasing the number of access of a data processing unit such as a CPU (Central Processing Unit), an MPU (MicroProcessor Unit), etc. to external memory such as main memory, comprising full-set associative cash memory, non-full-set associative cash memory, cache hit count storage means and a cache hit count management means. The full-set associative cash memory is memory capable of preserving cache lines of high cache hit rates. When a first tag extracted from input address data matched one of first tags which have been stored in valid cache lines of the full-set associative cash memory, data which has been stored in a valid cache line corresponding to the matched first tag is read by the data processing unit as cache data. The non-full-set associative cash memory is provided to the cache system so as to be coupled with the full-set associative cash memory and to execute tag comparison for the judgment on the cache hit simultaneously with the full-set associative cash memory. When a second tag extracted from the input address data matched a second tag which has been stored in a valid cache line of the non-full-set associative cash memory corresponding to an index extracted from the input address data, data which has been stored in the valid cache line corresponding to the matched second tag is read by the data processing unit as cache data. Each of the cache hit count storage means is provided corresponding to each of the cache lines of the full-set associative cash memory for storing a cache hit count value concerning the number of cache hits which occurred to the cache line. The cache hit count management means counts the number of cache hits in each cache line of the full-set associative cash memory and thereby manages and updates the cache hit count values which are stored in the cache hit count storage means. If miss hits occurred to both the full-set associative cash memory and the non-full-set associative cash memory when the non-full-set associative cash memory has no invalid cache line corresponding to the index and the full-set associative cash memory has one or more invalid cache lines, data which has been stored in a valid cache line of the non-full-set associative cash memory corresponding to the index to which the miss hit occurred is transferred to one of the invalid cache lines of the full-set associative cash memory, and data fetched from the external memory due to the miss hits is written into the cache line of the non-full-set associative cash memory from which data has been transferred to the full-set associative cash memory. If miss hits occurred to both the full-set associative cash memory and the non-full-set associative cash memory when the non-full-set associative cash memory has no invalid cache line corresponding to the index and the full-set associative cash memory is full of valid cache lines, data which has been stored in a valid cache line of the non-full-set associative cash memory corresponding to the index to which the miss hit occurred is transferred to one of valid cache lines of the full-set associative cash memory having the smallest cache hit count value, and data fetched from the external memory due to the miss hits is written into the cache line of the non-full-set associative cash memory from which data has been transferred to the full-set associative cash memory. If miss hits occurred to both the full-set associative cash memory and the non-full-set associative cash memory when the non-full-set associative cash memory has an invalid cache line corresponding to the index, data fetched from the external memory due to the miss hits is written into an invalid cache line of the non-full-set associative cash memory corresponding to the index.

In accordance with a second aspect of the present invention, in the first aspect, when a cache hit occurred to a cache line of the full-set associative cash memory, the cache hit count management means increments the cache hit count value of the cache line by 1, and when miss hits occurred to both the full-set associative cash memory and the non-full-set associative cash memory, the cache hit count management means decrements the cache hit count values of all the cache lines of the full-set associative cash memory by 1 at once.

In accordance with a third aspect of the present invention, in the first aspect, when a cache hit occurred to a cache line of the full-set associative cash memory, the cache hit count management means increments the cache hit count value of the cache line by 1, and when a miss hit occurred to the full-set associative cash memory, the cache hit count management means decrements the cache hit count values of all the cache lines of the full-set associative cash memory by 1 at once.

In accordance with a fourth aspect of the present invention, in the first aspect, when a cache hit occurred to a cache line of the full-set associative cash memory, the cache hit count management means increments the cache hit count value of the cache line by 1.

In accordance with a fifth aspect of the present invention, in the first aspect, the cache system further comprises cache hit date/time storage means. Each of the cache hit date/time storage means is provided corresponding to each of the cache lines of the full-set associative cash memory for storing data concerning the date and time of a recent cache hit which occurred to the cache line. In the case where miss hits occurred to both the full-set associative cash memory and the non-full-set associative cash memory when the non-full-set associative cash memory has no invalid cache line corresponding to the index and the full-set associative cash memory is full of valid cache lines, a least recently used cache line is selected from the valid cache lines of the full-set associative cash memory having the smallest cache hit count value based on the data stored in the cache hit date/time storage means, and the selected least recently used cache line is designated as the destination of the data transfer from the non-full-set associative cash memory to the full-set associative cash memory.

In accordance with a sixth aspect of the present invention, in the first aspect, direct mapping cache memory is employed as the non-full-set associative cash memory.

In accordance with a seventh aspect of the present invention, in the first aspect, N-way set associative cache memory (N=2, 4, 8, . . . ) is employed as the non-full-set associative cash memory.

In accordance with an eighth aspect of the present invention, in the seventh aspect, the cache system further comprises LRU storage means. Each of the LRU storage means is provided corresponding to each index for storing an LRU (least recently used) value for indicating a least recently used one of the N cache lines corresponding to the index. In the case where miss hits occurred to both the full-set associative cash memory and the N-way set associative cache memory when the N-way set associative cache memory has no invalid cache line corresponding to the index and the full-set associative cash memory has one or more invalid cache lines, a cache line designated by the LRU value is selected from the N miss hit cache lines of the N-way set associative cache table and data which has been stored in the selected cache line is transferred to one of invalid cache lines of the full-set associative cash memory, and data fetched from the external memory due to the miss hits is written into the selected cache line of the N-way set associative cache table from which data has been transferred to the full-set associative cash memory. In the case where miss hits occurred to both the full-set associative cash memory and the N-way set associative cache memory when the N-way set associative cache memory has no invalid cache line corresponding to the index and the full-set associative cash memory is full of valid cache lines, a cache line designated by the LRU value is selected from the N miss hit cache lines of the N-way set associative cache table and data which has been stored in the selected cache line is transferred to one of valid cache lines of the full-set associative cash memory having the smallest cache hit count value, and data fetched from the external memory due to the miss hits is written into the selected cache line of the N-way set associative cache table from which data has been transferred to the full-set associative cash memory. In the case where miss hits occurred to both the full-set associative cash memory and the N-way set associative cache memory when the N-way set associative cache memory has one or more invalid cache lines corresponding to the index, data fetched from the external memory due to the miss hits is written into one of the invalid cache lines of the N-way set associative cache memory corresponding to the index.

In accordance with a ninth aspect of the present invention, in the eighth aspect, the cache system further comprises cache hit date/time storage means. Each of the cache hit date/time storage means is provided corresponding to each of the cache lines of the full-set associative cash memory for storing data concerning the date and time of a recent cache hit which occurred to the cache line. In the case where miss hits occurred to both the full-set associative cash memory and the N-way set associative cache memory when the N-way set associative cache memory has no invalid cache line corresponding to the index and the full-set associative cash memory is full of valid cache lines, a least recently used cache line is selected from the valid cache lines of the full-set associative cash memory having the smallest cache hit count value based on the data stored in the cache hit date/time storage means, and the selected least recently used cache line is designated as the destination of the data transfer from the N-way set associative cash memory to the full-set associative cash memory.

In accordance with a tenth aspect of the present invention, in the first aspect, the cache system further comprises secondary cache memory which is provided in addition to primary cache memory composed of the full-set associative cash memory and the non-full-set associative cash memory.

In accordance with an eleventh aspect of the present invention, there is provided a cache processing method for decreasing the number of access of a data processing unit such as a CPU (Central Processing Unit), an MPU (MicroProcessor Unit), etc. to external memory such as main memory, employing a combination of full-set associative cash memory capable of preserving high-hit-rate cache lines and non-full-set associative cash memory which executes tag comparison for the judgment on the cache hit simultaneously with the full-set associative cash memory. The cache processing method comprises a first tag comparison step, a second tag comparison step, a cache hit count management step, a first cache data reading process, a second cache data reading process, a first data transfer step, a second data transfer step and a third data transfer step. In the first tag comparison step, a first tag extracted from input address data is compared with first tags which have been stored in valid cache lines of the full-set associative cash memory and it is judged that a cache hit occurred to the full-set associative cash memory if the extracted first tag matched one of the stored first tags. The second tag comparison step is executed simultaneously with the first tag comparison step. In the second tag comparison step, a second tag extracted from the input address data is compared with one or more second tags which have been stored in one or more valid cache lines of the non-full-set associative cash memory corresponding to an index extracted from the input address data and it is judged that a cache hit occurred to the non-full-set associative cash memory if the extracted second tag matched one of the stored second tags corresponding to the index. In the cache hit count management step, the number of cache hits which occurred to each cache line of the full-set associative cash memory is counted and thereby cache hit count values with respect to the cache lines of the full-set associative cash memory which are stored in cache hit count storage means corresponding to the cache lines are updated. In the first cache data reading process, if a cache hit occurred to the full-set associative cash memory in the first tag comparison step, data which has been stored in a valid cache line of the full-set associative cash memory corresponding to the matched first tag is read by the data processing unit as cache data. In the second cache data reading process, if a cache hit occurred to the non-full-set associative cash memory in the second tag comparison step, data which has been stored in a valid cache line of the non-full-set associative cash memory corresponding to the index and the matched second tag is read by the data processing unit as cache data. In the first data transfer step, if miss hits occurred to both the full-set associative cash memory and the non-full-set associative cash memory when the non-full-set associative cash memory has no invalid cache line corresponding to the index and the full-set associative cash memory has one or more invalid cache lines, data which has been stored in a valid cache line of the non-full-set associative cash memory corresponding to the index to which the miss hit occurred is transferred to one of the invalid cache lines of the full-set associative cash memory, and data fetched from the external memory due to the miss hits is written into the cache line of the non-full-set associative cash memory from which data has been transferred to the full-set associative cash memory. In the second data transfer step, if miss hits occurred to both the full-set associative cash memory and the non-full-set associative cash memory when the non-full-set associative cash memory has no invalid cache line corresponding to the index and the full-set associative cash memory is full of valid cache lines, the data which has been stored in a valid cache line of the non-full-set associative cash memory corresponding to the index to which the miss hit occurred is transferred to one of valid cache lines of the full-set associative cash memory having the smallest cache hit count value, and data fetched from the external memory due to the miss hits is written into the cache line of the non-full-set associative cash memory from which data has been transferred to the full-set associative cash memory. In the third data transfer step, if miss hits occurred to both the full-set associative cash memory and the non-full-set associative cash memory when the non-full-set associative cash memory has an invalid cache line corresponding to the index, data fetched from the external memory due to the miss hits is written into an invalid cache line of the non-full-set associative cash memory corresponding to the index.

In accordance with a twelfth aspect of the present invention, in the cache hit count management step of the eleventh aspect, when a cache hit occurred to a cache line of the full-set associative cash memory, the cache hit count value of the cache line is incremented by 1, and when miss hits occurred to both the full-set associative cash memory and the non-full-set associative cash memory, the cache hit count values of all the cache lines of the full-set associative cash memory are decremented by 1 at once.

In accordance with a thirteenth aspect of the present invention, in the cache hit count management step of the eleventh aspect, when a cache hit occurred to a cache line of the full-set associative cash memory, the cache hit count value of the cache line is incremented by 1, and when a miss hit occurred to the full-set associative cash memory, the cache hit count values of all the cache lines of the full-set associative cash memory are decremented by 1 at once.

In accordance with a fourteenth aspect of the present invention, in the cache hit count management step of the eleventh aspect, when a cache hit occurred to a cache line of the full-set associative cash memory, the cache hit count value of the cache line is incremented by 1.

In accordance with a fifteenth aspect of the present invention, in the eleventh aspect, the cache processing method further comprises a cache hit date/time storage step. In the cache hit date/time storage step, data concerning the date and time of a recent cache hit which occurred to a cache line of the full-set associative cash memory is stored in a cache hit date/time storage means which is provided corresponding to the cache line. In the second data transfer step, a least recently used cache line is selected from the valid cache lines of the full-set associative cash memory having the smallest cache hit count value based on the data stored in the cache hit date/time storage means, and the selected least recently used cache line is designated as the destination of the data transfer from the non-full-set associative cash memory to the full-set associative cash memory.

In accordance with a sixteenth aspect of the present invention, in the eleventh aspect, direct mapping cache memory is employed as the non-full-set associative cash memory.

In accordance with a seventeenth aspect of the present invention, in the eleventh aspect, N-way set associative cache memory (N=2, 4, 8, . . . ) is employed as the non-full-set associative cash memory.

In accordance with an eighteenth aspect of the present invention, in the seventeenth aspect, the cache processing method further comprises an LRU storage step. In the LRU storage step, an LRU (least recently used) value for indicating a least recently used one of the N cache lines of the N-way set associative cache memory corresponding to an index is stored in an LRU storage means which is provided corresponding to the index. In the first data transfer step, a cache line designated by the LRU value is selected from the N miss hit cache lines of the N-way set associative cache table and data which has been stored in the selected cache line is transferred to one of invalid cache lines of the full-set associative cash memory, and data fetched from the external memory due to the miss hits is written into the selected cache line of the N-way set associative cache table from which data has been transferred to the full-set associative cash memory. In the second data transfer step, a cache line designated by the LRU value is selected from the N miss hit cache lines of the N-way set associative cache table and data which has been stored in the selected cache line is transferred to one of valid cache lines of the full-set associative cash memory having the smallest cache hit count value, and data fetched from the external memory due to the miss hits is written into the selected cache line of the N-way set associative cache table from which data has been transferred to the full-set associative cash memory. In the third data transfer step, data fetched from the external memory due to the miss hits is written into one of invalid cache lines of the N-way set associative cache memory corresponding to the index.

In accordance with a nineteenth aspect of the present invention, in the eighteenth aspect, the cache processing method further comprises a cache hit date/time storage step. In the cache hit date/time storage step, data concerning the date and time of a recent cache hit which occurred to a cache line of the full-set associative cash memory is stored in a cache hit date/time storage means which is provided corresponding to the cache line. In the second data transfer step, a least recently used cache line is selected from the valid cache lines of the full-set associative cash memory having the smallest cache hit count value based on the data stored in the cache hit date/time storage means, and the selected least recently used cache line is designated as the destination of the data transfer from the N-way set associative cache table to the full-set associative cash memory.

In accordance with a twentieth aspect of the present invention, in the eleventh aspect, the cache processing method further comprises a secondary cache access step in which secondary cache memory, which is provided in addition to primary cache memory composed of the full-set associative cash memory and the non-full-set associative cash memory, is made access to in the case where miss hits occurred to both the full-set associative cash memory and the non-full-set associative cash memory.

In accordance with twenty-first through thirtieth aspects of the present invention, there are provided computer-readable record mediums storing programs for instructing a computer to execute essential parts of the cache processing methods of the eleventh through twentieth aspects of the present invention.

BRIEF DESCRIPTION OF THE DRAWINGS

The objects and features of the present invention will become more apparent from the consideration of the following detailed description taken in conjunction with the accompanying drawings, in which:

FIG. 2 is a schematic diagram showing an example of a program which is executed by a CPU;

FIGS. 3A and 3B are schematic diagrams showing examples of change of statuses of the direct mapping cache memory of FIG. 1 when the program of FIG. 2 is executed by the CPU, in which FIG. 3A shows the status just after the execution of an instruction (1) shown in FIG. 2 and FIG. 3B shows the status just after the execution of an instruction (5) shown in FIG. 2;

FIGS. 4A and 4B are schematic diagrams showing access time of the CPU employing the direct mapping cache memory when the program of FIG. 2 is executed twice, in which FIG. 4A shows a case where the program of FIG. 2 is executed for the first time and FIG. 4B shows a case where the program of FIG. 2 is executed for the second time;

FIG. 8 is a schematic diagram showing an example of a program which is executed by a CPU of the computer system of FIG. 6;

FIGS. 9A and 9B are schematic diagrams showing access time of the CPU employing the cache system of the first embodiment when the program of FIG. 8 is executed twice, in which FIG. 9A shows a case where the program of FIG. 8 is executed for the first time and FIG. 9B shows a case where the program of FIG. 8 is executed for the second time;

FIG. 10 is a schematic diagram showing the statuses of an FSA cache table TA and a DM cache table TB of the cache system of the first embodiment just after the execution of an instruction (5) shown in FIG. 8;

FIG. 12 is a block diagram showing the composition of a cache section of a cache system in accordance with a second embodiment of the present invention; and FIG. 13 is a schematic diagram showing a 4-way set associative cache table TC which is employed as a non-full-set associative cash table in a cache section 15B of a cache system in accordance with a third embodiment of the present invention.

DESCRIPTION OF THE PREFERRED EMBODIMENTS

Figure 1:
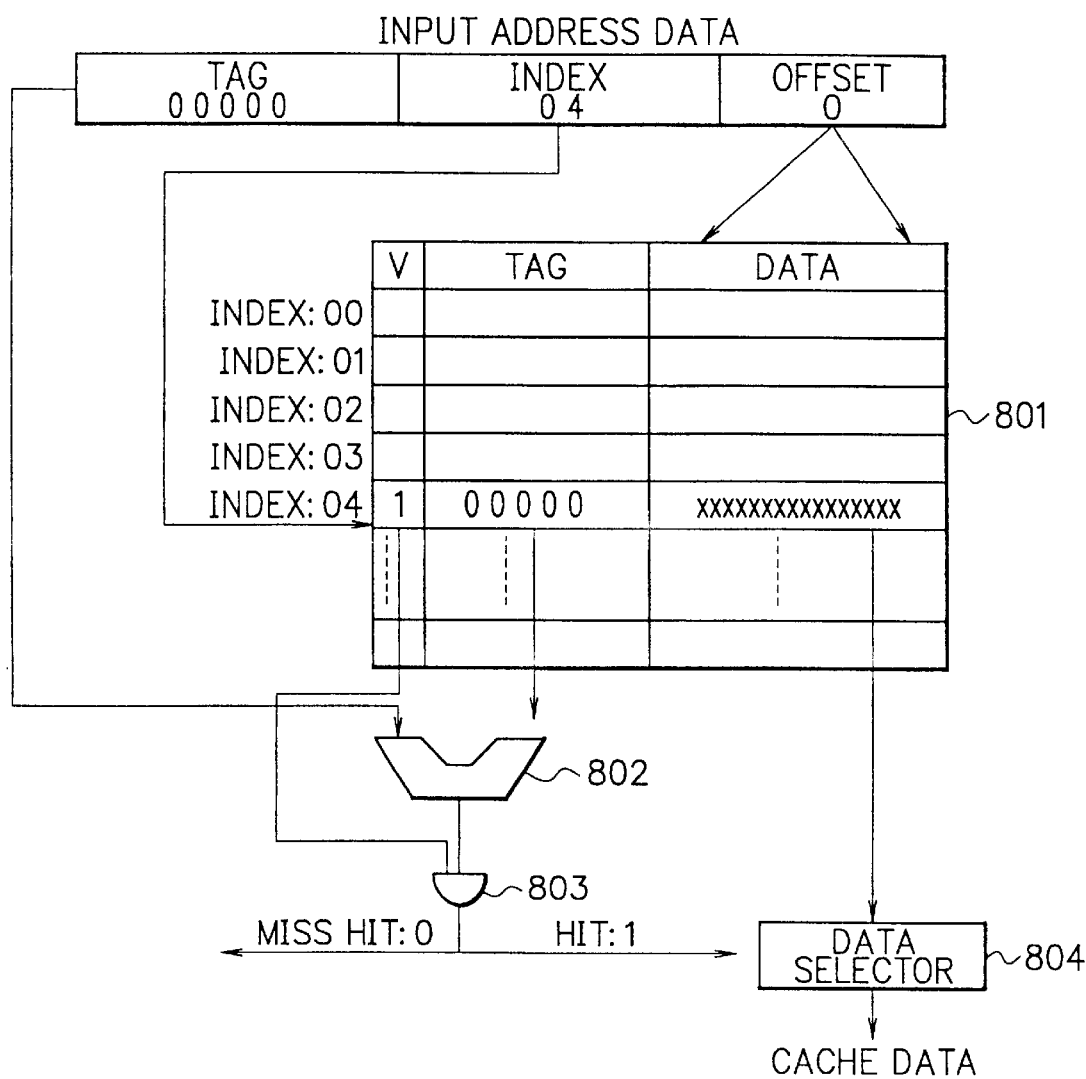
FIG. 1 is a schematic block diagram showing typical conventional direct mapping cache memory.

Referring now to the drawings, a description will be given in detail of preferred embodiments in accordance with the present invention.

Figure 5:
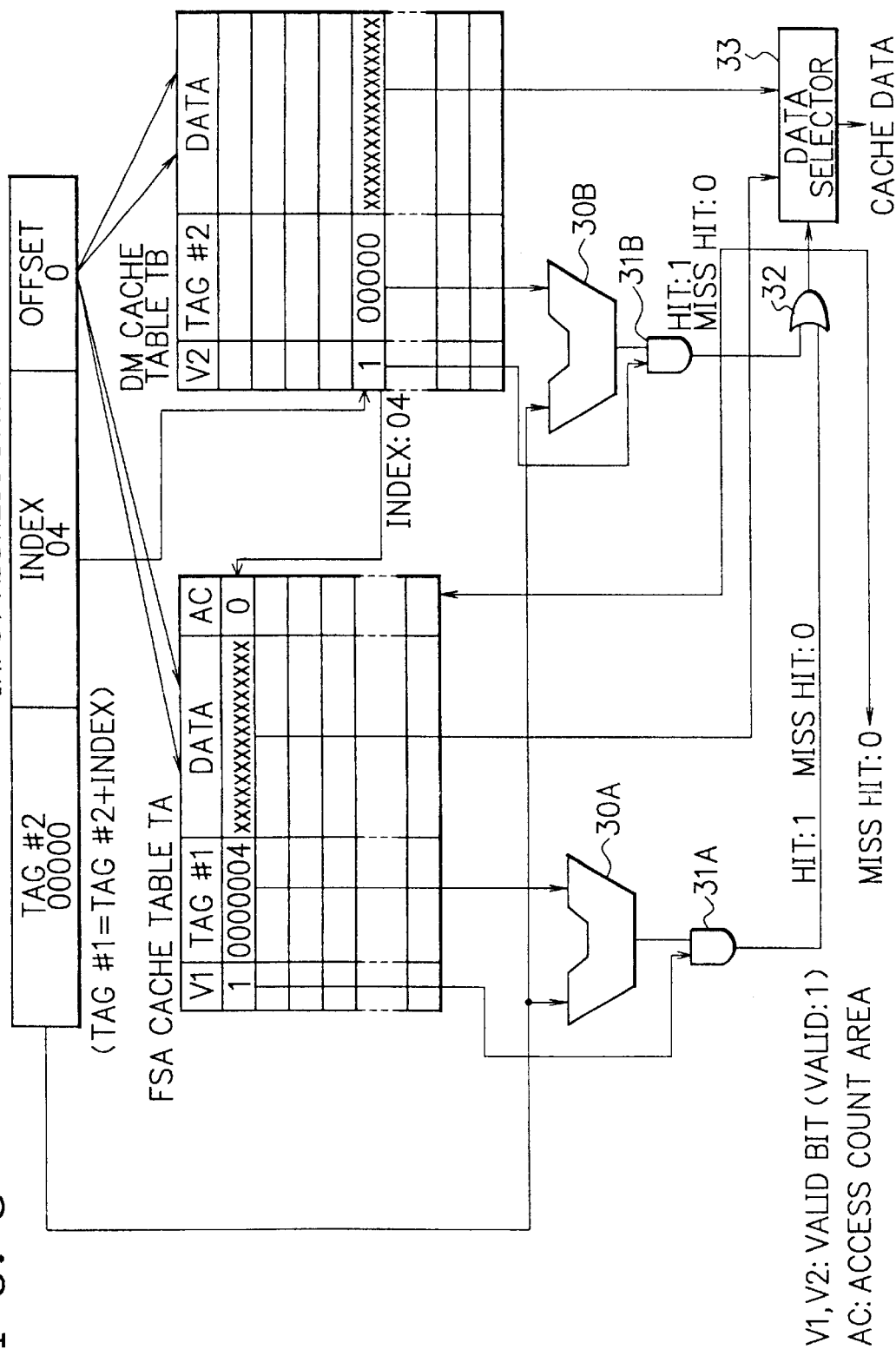
FIG. 5 is a block diagram showing the composition of a cache section of a cache system in accordance with a first embodiment of the present invention.
Figure 6:
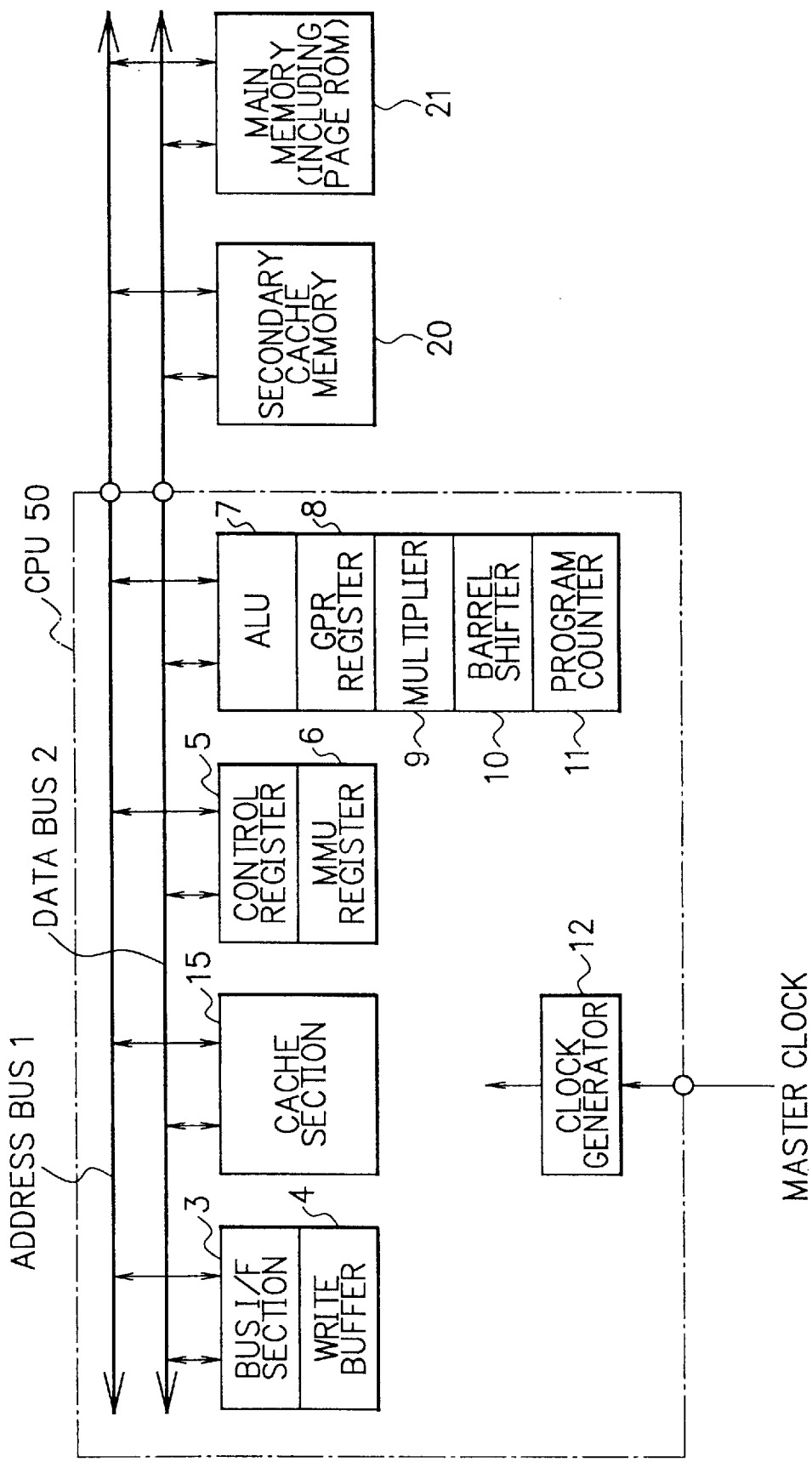
FIG. 6 is a block diagram showing a computer system to which the cache system according to the first embodiment of the present invention is applied.

FIG. 5 is a block diagram showing the composition of a cache section 15 of a cache system in accordance with a first embodiment of the present invention. FIG. 6 is a block diagram showing a computer system to which the cache system according to the first embodiment of the present invention is applied.

The computer system of FIG. 6 is mainly composed of a CPU (Central Processing Unit) 50, a secondary cache memory 20 and a main memory 21. The secondary cache memory 20 is provided outside the CPU 50. The secondary cache memory 20 is implemented by, for example, synchronous SRAM including tag RAM and data RAM, memory including page ROM, etc. The type of the secondary cache memory 20 (full-set associative cash memory or non-full-set associative cash memory) is not particularly limited. In the computer system of FIG. 6, an address bus and a data bus 2 are provided in order to connect the CPU 50, the secondary cache memory 20, the main memory 21, etc. The main memory 21 is connected to the address bus 1 and the data bus 2 outside the CPU via the secondary cache memory 20.

The CPU 50 includes a bus interface (I/F) section 3, a write buffer 4, a control register 5, an MMU (Memory Management Unit) register 6, an arithmetic logic operation unit (ALU) 7, a GPR (Generally Purpose Register) register 8, a multiplier 9, a barrel shifter 10, a program counter 11, a clock generator 12, and a cache section 15. The cache section 15 is provided to the CPU 50 as the primary cache memory of the cache system of this embodiment. The cache section 15 is connected to the address bus 1 and the data bus 2.

The clock generator 12 generates a clock signal of the computer system by multiplying the frequency of a master clock signal supplied thereto by a particular frequency multiplication number, and supplies the clock signal to the components of the computer system. The write buffer 4 is also connected to the address bus 1 and the data bus 2 via the bus I/F section 3, for temporarily storing system data to be written into the main memory 21, the secondary cache memory 20, etc. The system data writing is executed according to control data which is supplied to the bus I/F section 3. The control register 5 and the MMU register 6 are also connected to the address bus 1 and the data bus 2. The control register 5 stores data for basic settings of the CPU 50 such as the frequency multiplication number of the clock generator 12. The MMU register 6 stores data for address conversion between virtual addresses and physical addresses. A unit including the ALU 7, the GPR register 8, the multiplier 9, the barrel shifter 10 and the program counter 11 is also connected to the address bus 1 and the data bus 2 for executing instructions. The unit including the components 7 through 11 will hereafter be referred to as an "instruction execution unit".

Referring to FIG. 5, the cache section 15 as the primary cache memory of the cache system of this embodiment includes a full-set associative (FSA) cache table TA, a direct mapping (DM) cache table TB, comparators 30A and 30B, AND gates 31A and 31B, a OR gate 32, and a data selector 33.

The primary cache memory (i.e. the cache section 15) of the cache system of this embodiment is composed of full-set associative (FSA) cache memory and direct mapping (DM) cache memory which are coupled together. Incidentally, while only one comparator 30A and only one AND gate 31A are shown in FIG. 5, concretely, the comparator 30A and the AND gate 31A are provided corresponding to each cache line of the FSA cache table TA, and logical OR of the outputs of the AND gates 31A corresponding to the cache lines is taken by one or more unshown OR =gates.

At the top of FIG. 5, an example of an input address data "00000040" (hex) is shown. The input address data includes a tag #2, an index and an offset. The tag #2 is a tag which is used with regard to the DM cache table TB. Another tag #1 which is used with regard to the FSA cache table TA is defined as the tag #2 and the index added together (tag #1=index+tag #2). In the case of the input address data "00000040", the tag #2 is "00000" (the front 5 hexadecimal digits of the input address data, for example), the index is "04" (the next 2 hexadecimal digits of the input address data, for example), the tag #1 is "0000004" (the front 7 hexadecimal digits of the input address data, for example), and the offset is "0" (the last 1 hexadecimal digit of the input address data, for example).

On each cache line of the FSA cache table TA, an access count area (access count bits) AC for indicating the number of access which occurred to the cache line is provided. By access frequency management of the cache lines by use of the access count area AC which will be explained later, preservation of cache lines of high access frequencies (high cache hit rates) in the FSA cache table TA is realized. Incidentally, an access counter for managing the access count areas AC of the cache lines of the FSA cache table TA is implemented by the aforementioned instruction execution unit including the components 7 through 11, for example.

The comparator 30A compares a tag #1 which is extracted from the input address data with tags #1 which have been stored in the cache lines of the FSA cache table TA. When the extracted tag #1 matched one of the stored tags #1, the comparator 30A outputs and supplies a comparison signal of a high level (1) to the AND gate 31A. To the AND gate 31A, a valid bit V1 (1/0) of the cache line corresponding to the matched tag #1 (indicating whether or not the cache line is valid or not) is supplied from the FSA cache table TA. The AND gate 31A outputs a cache hit signal (of a high level (1)) if both the comparison signal supplied from the comparator 30A and the valid bit V1 supplied from the FSA cache table TA are "1". Incidentally, as mentioned before, while one comparator 30A and one AND gate 31A are shown in FIG. 5, the comparator 30A and the AND gate 31A are concretely provided to each cache line of the FSA cache table TA, and logical OR of the outputs of the AND gates 31A of the cache lines is taken.

At the same time, the comparator 30B compares a tag #2 which is extracted from the input address data with a tag #2 which has been stored in a cache line of the DM cache table TB corresponding to an index which is extracted from the input address data. When the extracted tag #2 matched the tag #2 which has been stored in the cache line corresponding to the index, the comparator 30B outputs and supplies a comparison signal of a high level (1) to the AND gate 31B. To the AND gate 31B, a valid bit V2 (1/0) of the cache line corresponding to the matched tag #2 (indicating whether or not the cache line is valid or not) is supplied from the DM cache table TB. The AND gate 31B outputs a cache hit signal (of a high level (1)) if both the comparison signal supplied from the comparator 30B and the valid bit V2 supplied from the DM cache table TB are "1".

The OR gate 32 outputs an activation signal (of a high level (1)) if the cache hit signal supplied from the AND gate 31A or the cache hit signal supplied from the AND gate 31B is "1". If the activation signal supplied from the OR gate 32 to the data selector 33 is "1", the data selector 33 selects part of data which has been stored in the hit cache line (in which the tag #1 or #2 matched) of the FSA cache table TA or the DM cache table TB based on the offset of the input address data, and sends the selected data to an unshown instruction decoder or the GPR register 8 of the CPU 50. Incidentally, when a cache hit occurs in this embodiment, it occurs to the FSA cache table TA or to the DM cache table TB, that is, there is no case where cache hits occur both to the FSA cache table TA and to the DM cache table TB.

The FSA cache table (FSA cache memory) TA shown in FIG. 5 needs more complicated circuit composition and larger power consumption than the DM cache table (DM cache memory) TB, however, preservation of cache lines of high hit rates is possible in the FSA cache table TA. On the other hand, the DM cache table (DM cache memory) TB can implement high speed access with a small circuit scale, however, its cache hit rate is easily deteriorated. The primary cache memory (the cache section 15) of the cache system of this embodiment is implemented by coupling the FSA cache table TA and the DM cache table TB having such characteristics together.

Figure 7:
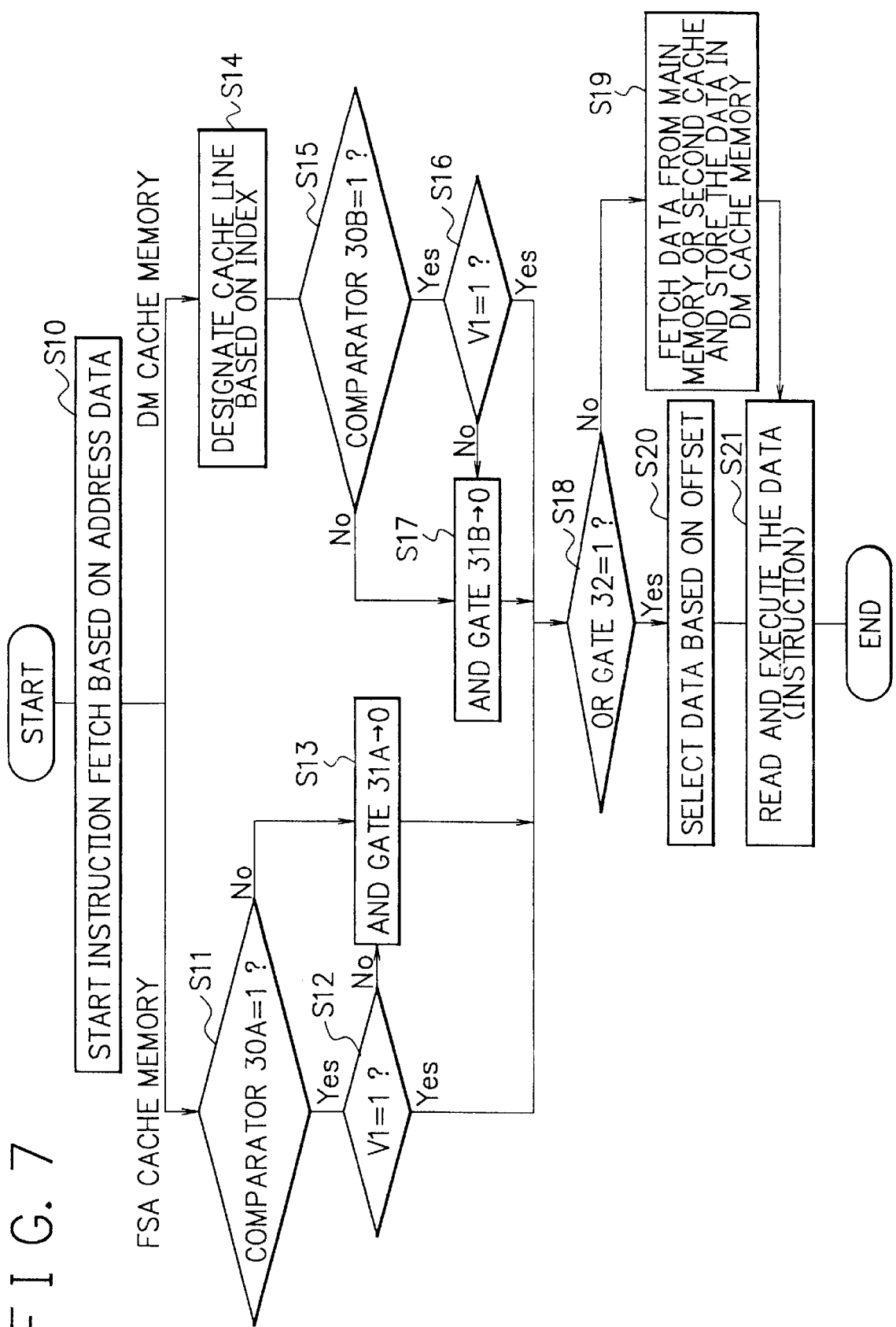
FIG. 7 is a flow chart showing the operation of the cache system according to the first embodiment of the present invention.

In the following, the operation of the cache system according to the first embodiment of the present invention will be described in detail. FIG. 7 is a flow chart showing the operation of the cache system according to the first embodiment of the present invention. Incidentally, in this embodiment, data fetched from the main memory 21 or the secondary cache memory 20 is stored and registered in the DM cache table TB (not registered in the FSA cache table TA). When a miss hit occurred to the cache section 15 (that is, when miss hit occurred to both the FSA cache table TA and a cache line of the DM cache table TB corresponding to the index extracted from the input address data), data which has been stored in the cache line of the DM cache table TB corresponding to the index is deleted or invalidated in the DM cache table TB and transferred to the FSA cache table TA.

The CPU 50 starts instruction fetch process according to the input address data which is supplied from the program counter 11 (step S10). In the FSA cache memory, the comparator 30A shown in FIG. 5 (which is concretely composed of comparators 30A corresponding to each cache line of the FSA cache table TA) compares a tag #1 (part of the input address data other than the offset) extracted from the input address data with tags #1 which have been stored in the FSA cache table TA. If the extracted tag #1 matched one of the stored tags #1 ("Yes" in step S11), the comparator 30A outputs the comparison signal of a high level "1" to the AND gate 31A. If the output of the comparator 30A and the valid bit V1 (1/0) of the cache line corresponding to the matched tag #1 are both "1" ("Yes" in step S12), the AND gate 31A shown in FIG. 5 (which is concretely composed of AND gates 31A (corresponding to each cache line of the FSA cache table TA) and one or more OR gates for taking logical OR of the outputs of the AND gates 31A) outputs the cache hit signal of a high level "1" (indicating that a valid cache hit occurred to the FSA cache table TA) to the OR gate 32. If the extracted tag #1 did not match anyone of the stored tags #1 ("No" in the step S11) or if the valid bit V1 of the hit cache line is "0" ("No" in the step S12), the output of the AND gate 31A becomes "0" (step S13).

At the same time, tag comparison for the judgment on the presence or absence of the cache hit is also executed in the DM cache memory. In the DM cache memory, an index (2 hexadecimal digits in the input address data following the tag #2 (front 5 hexadecimal digits)) is extracted from the input address data and thereby a cache line of the DM cache table TB corresponding to the index is selected and designated (step S14). The comparator 30B shown in FIG. 5 compares a tag #2 (part of the input address data other than the index and the offset) extracted from the input address data with a tag #2 which has been stored in the selected cache line of the FSA cache table TA corresponding to the index. If the extracted tag #2 matched the stored tag #2 ("Yes" in step S15), the comparator 30B outputs the comparison signal of a high level "1" to the AND gate 31B. If the output of the comparator 30B and the valid bit V2 (1/0) of the cache line corresponding to the matched tag #2 are both "1" ("Yes" in step S16), the AND gate 31B outputs the cache hit signal of a high level "1" (indicating that a valid cache hit occurred to the DM cache table TB) to the OR gate 32. If the extracted tag #2 did not match the stored tag #2 corresponding to the index ("No" in the step S15) or if the valid bit V2 of the hit cache line is "0" ("No" in the step S16), the output of the AND gate 31B becomes "0" (step S17).

The OR gate 32 shown in FIG. 5 outputs the activation signal of a high level "1" to the data selector 33 if the cache hit signal supplied from the AND gate 31A or the cache hit signal supplied from the AND gate 31B is "1". Otherwise (if both the cache hit signals supplied from the AND gates 31A and 31B are "0"), the OR gate 32 outputs the activation signal of a low level "0" to the data selector 33. Incidentally, in this embodiment, there is no case where cache hits occur both to the FSA cache table TA and to the DM cache table TB, and thus there is no case where both the cache hit signals supplied from the AND gates 31A and 31B are "1".

In the case where the activation signal outputted by the OR gate 32 is "0" (indicating that a miss hit occurred to the cache section 15) ("No" in the step S18), the CPU 50 makes access to the main memory 21 via the secondary cache memory 20 and fetches data from the main memory 21 (when a miss hit occurred to the secondary cache memory 20) or the secondary cache memory 20 (when a cache hit occurred to the secondary cache memory 20). In this case, the data (the tag #2 and the data) which has been stored in the cache line of the DM cache table TB corresponding to the index (to which the miss hit occurred) is transferred to the FSA cache table TA (the data in the cache line of the DM cache table TB is deleted or invalidated), and the data fetched from the main memory 21 or the secondary cache memory 20 is stored in the cache line of the DM cache table TB (step S19). Thereafter, the CPU 50 reads the data of the cache line of the DM cache table TB (the data (data or instruction) fetched from the main memory 21 or the secondary cache memory 20) and executes a process for the data or the instruction (step S21).

In the case where the activation signal outputted by the OR gate 32 is "1" (indicating that a cache hit occurred to the cache section 15) ("Yes" in the step S18), part of the data which has been stored in the hit cache line (of the FSA cache table TA or the DM cache table TB to which the cache hit occurred) is selected and extracted by the data selector 33 based on the offset of the input address data (step S20), and a process for the extracted data (data or instruction) is executed by the CPU 50 (step S21).

In the following, the operations of the FSA cache table TA and the DM cache table TB will be explained in detail.

In initialization (when the computer system of FIG. 6 is reset or turned ON), all the cache lines of the FSA cache table TA and the DM cache table TB are set invalid, that is, the valid bits V1 and V2 of the cache lines are set to "0". Thereafter, when data is written or transferred into a cache line of the FSA cache table TA or the DM cache table TB, the cache line is turned valid, that is, the valid bit V1 or V2 of the cache line is turned from "0" to "1".

In the case where a miss hit occurred to the cache section 15 (i.e. in the case where miss hits occurred to the FSA cache table TA and to the cache line of the DM cache table TB corresponding to the index of the input address data), data (the data and the tag #2) which has been stored in the cache line of the DM cache table TB is transferred to an invalid cache line of the FSA cache table TA. By the transfer, the cache line of the DM cache table TB is turned invalid (that is, the data which has been stored in the cache line of the DM cache table TB is invalidated or substantially deleted) and the cache line of the FSA cache table TA is turned valid. To the cache line of the DM cache table TB which turned invalid, the data fetched from the main memory 21 or the secondary cache memory 20 is written, and thereby the cache line is turned valid again.

In the FSA cache table TA, valid cache lines are managed and controlled based on the access count values which are stored in the access count areas AC of the cache lines. The number of bits of the access count area of each cache line is set at 2 bits for example in this embodiment. When data is written into a cache line of the FSA cache table TA, the access count value of the cache line is reset to "0" by the unshown access counter. The unshown access counter increments the access counter value of a cache line by 1 when a cache hit occurred to the cache line.

When a miss hit occurred to the cache section 15 (i.e. in the case where miss hits occurred to the FSA cache table TA and to the cache line of the DM cache table TB corresponding to the index), the unshown access counter decrements the access count values of all the cache lines of the FSA cache table TA by 1 at once. The minimum value and the maximum value of the access count value in this embodiment are "0" and "3" in decimal digits. Therefore, the access count value is not decremented below "0" nor incremented above "3".

Incidentally, it is also possible to let the unshown access counter execute the simultaneous decrement (−1) of the access count values of all the cache lines of the FSA cache table TA, when a miss hit occurred to the FSA cache table TA (that is, when miss hits occurred in all the cache lines of the FSA cache table TA). In this case, the simultaneous decrement is executed even when a cache hit occurred to the DM cache table TB and a miss hit occurred to the FSA cache table TA, differently from the above method, therefore, the access count values are decremented more frequently.

To sum up, each access count value (0~3) has the following meaning:
AC effective access (cache hit) count of the cache line

| 0 | 0 times or less |
| 1 | 1 time |
| 2 | 2 times |
| 3 | 3 times or more |

When the FSA cache table TA has some invalid cache lines, the invalid cache lines are regarded as the destination of the data transfer from the miss hit cache line (cache line to which the miss hit occurred) of the DM cache table TB to the FSA cache table TA, as mentioned before. Therefore, in the case where a miss hit occurred to the cache section 15 when the FSA cache table TA has some invalid cache lines, data (the data and the tag #2) which has been stored in the miss hit cache line of the DM cache table TB is transferred to one of the invalid cache lines of the FSA cache table.

On the other hand, when the FSA cache table TA is full of valid cache lines, cache lines of the FSA cache table TA having the smallest access count value are regarded as the destination of the data transfer from the miss hit cache line of the DM cache table TB to the FSA cache table TA. Therefore, in the case where a miss hit occurred to the cache section 15 when the FSA cache table TA is full of valid cache lines, data (the data and the tag #2) which has been stored in the miss hit cache line of the DM cache table TB is transferred to one of the cache lines of the FSA cache table TA having the smallest access count value. The destination can be selected randomly from the smallest-access-count cache lines. However, it is also possible to select a least recently used cache line (whose recent cache hit occurred the oldest) from the smallest-access-count cache lines and regard the selected least recently used cache line as the destination of the data transfer. Such selection of the least recently used cache line can be implemented by providing an area for storing access date/time to each cache line of the FSA cache table TA, for example.

Incidentally, when a miss hit occurred to the cache section 15 when the DM cache table TB has an invalid cache line corresponding to the index, the data fetched from the main memory 21 or the secondary cache memory 20 is written in the invalid cache line of the DM cache table TB corresponding to the index. In this case, the data transfer from the DM cache table TB to the FSA cache table TA is not executed.

In the following, an explanation will be given on execution time of the cache processing.

FIG. 8 is a schematic diagram showing an example of a program which is executed by the CPU 50. Incidentally, FIG. 8 is the same as FIG. 2 which has been referred to in the "Description of the Prior Art". Referring to FIG. 8, the program includes instructions (1), (2), . . . to be executed. The CPU 50 first refers to input address data (which is supplied from the program counter 11) with regard to the first instruction (1). The input address data "00000040" with regard to the first instruction (1) indicates that the first instruction (1) has preliminarily been stored in an address "00000040" of the main memory 21. As mentioned before, the input address data "00000040" includes a tag #2 (00000), an index (04) and an offset (0) (and a tag #1 (0000004)). The input address data including the tag #1, the tag #2, the index and the offset is supplied to the cache section 15 and the process for cache hit judgment is executed as described before. According to the result of the cache hit judgment process, the CPU 50 obtains necessary data (the instruction (1)) from the FSA cache table TA, the DM cache table TB, or the main memory 21 (or the secondary cache memory 20), and executes the instruction (1). Thereafter, the same processes are executed for the subsequent instructions (2), (3), . . . .

FIGS. 9A and 9B are schematic diagrams showing access time of the CPU 50 employing the cache system of this embodiment when the program of FIG. 8 is executed twice, in which FIG. 9A shows a case where the program of FIG. 8 is executed for the first time and FIG. 9B shows a case where the program of FIG. 8 is executed for the second time. FIG. 10 is a schematic diagram showing the statuses of the FSA cache table TA and the DM cache table TB just after the execution of the instruction (5) of FIG. 8 by the CPU 50.

Incidentally, the following explanation concerning program execution time will be given on the same assumptions as those which were adopted in the explanation in the "Description of the Prior Art". The length of the data storage area of each cache line of the FSA cache table TA and the DM cache table TB is 4 assumed to be words (16 bytes) and the length of each instruction is assumed to be 1 word (4 bytes) (that is, 4 instructions are stored in the data storage area of each cache line of the FSA cache table TA and the DM cache table TB). Further, the explanation will be given assuming that data is fetched from the main memory 21 (no cache hit occurs to the secondary cache memory 20) when a miss hit occurred to the cache section 15, and data processing time of the secondary cache memory 20 is 0. The cache size of the DM cache table TB is set at 4 Kbytes, for example. Access time necessary for fetching data (instruction) from the main memory 21 is assumed to be 100 ns for the first word, and 30 ns for each of the following 3 words. Therefore, access time necessary for fetching data of 4 words (4 instructions) from the main memory 21 and storing the data in a cache line of the DM cache table TB becomes 100+30+30+30=190 ns. The CPU 50 is assumed to take 10 ns for reading and executing an instruction which has just been stored in the cache line of the DM cache table TB.

In the initialization, all the cache lines of the FSA cache table TA and the DM cache table TB are set invalid, that is, all the valid bits V1 and V2 of the cache lines are set to "0". Just after the initialization, no data substantially exists in the FSA cache table TA and the DM cache table TB since the valid bits V1 and V2 are all "0". Therefore, the CPU 50 fetches necessary data (instructions (1) through (4) corresponding to the first index "04" of the program of FIG. 8) from the main memory 21, and writes the fetched instructions (1) through (4) in a cache line of the DM cache table TB corresponding to the index "04". By the data writing, the cache line of the DM cache table TB corresponding to the index "04" is turned valid, that is, the valid bit V2 of the cache line is set to "1" (see FIG. 5). Thereafter, the CPU 50 reads the first instruction (1) from the cache line of the DM cache table TB and executes the instruction (1). In the first program execution shown in FIG. 9A, it takes 100+30+30+ 30+10=200 ns for the CPU 50 to execute the first instruction (1) after a start up routine of the computer system. Each of the following instructions (2), (3) and (4) respectively takes 10 ns to be executed (30 ns). Thereafter, the following four instructions corresponding to addresses 00001030 through 0000103C are executed by the CPU 50 in the same way (200+10+10+10=230 ns).

When the instruction (5) shown in FIG. 8 (corresponding to the aforementioned index "04") is to be executed by the CPU 50, the instruction (1) and the tag #2 (00000) corresponding to the instruction (1) have already been stored in the cache line of the DM cache table TB corresponding to the index "04". Therefore, a miss hit (00001≠00000) occurs in the cache line corresponding to the index "04". A miss hit also occurs to the FSA cache table TA in the first program execution. Therefore, the instruction (1) and the tag #2 (00000) which have been stored in the cache line of the DM cache table TB corresponding to the index "04" are transferred to an invalid cache line of the FSA cache table TA (or a cache line of the FSA cache table TA having the smallest access count value (in the case where the FSA cache table TA is full of valid cache lines)), and the instruction (5) fetched from the main memory 21 and a corresponding tag #2 (00001) are written into the cache line of the DM cache table TB corresponding to the index "04". Due to the miss hit, the execution of the instruction (5) also takes 100+30+ 30+30+10=200 ns. Each of the following three instructions respectively takes 10 ns to be executed (30 ns). Therefore, total program execution time in the first program execution becomes 230×3=690 ns.

At the point when the first program execution shown in FIG. 9A is finished, all the instructions of the program of FIG. 8 have already been stored in the FSA cache table TA or the DM cache table TB. For example, when the instruction (1) (corresponding to the aforementioned index "04") is to be executed by the CPU 50 in the second program execution, the instruction (1) has already been stored in the FSA cache table TA as shown in FIG. 10, and thus a miss hit does not occur in the second execution of the instruction (1). Therefore, in the second program execution shown in FIG. 9B, each instruction takes only 10 ns to be executed, respectively, and thus total program execution time in the second program execution becomes 10×12=120 ns. Therefore, total execution time for executing the program of FIG. 8 (FIG. 2) twice becomes 810 ns.

Total execution time of 1190 ns was necessary in the case where conventional direct mapping cache memory is employed, as shown before. Therefore, execution time of 380 ns is saved by use of the cache system according to the first embodiment of the present invention.

As described above, in the cache system according to the first embodiment of the present invention, the DM cache table TB and the FSA cache table TA are coupled together in the cache section 15 as the primary cache memory of the cache system, and the tag comparison for the judgment on the cache hit is executed simultaneously in the FSA cache table TA and the DM cache table TB. Therefore, high speed tag comparison is executed in the cache section 15 with an increased cache hit rate, and thereby the number of access and data access time of the CPU 50 to the main memory 21 (or the secondary cache memory 20) is reduced and thus high speed program execution is implemented.

Further, data management/transfer is executed in the cache a system as follows. The number of access (cache hits) to each cache line of the FSA cache table TA (access count value) is stored in the access count area AC of each cache line. When a cache hit occurred to a cache line of the FSA cache table TA, the access count value of the cache line is incremented by 1. When a miss hit occurred to the cache section 15 (or when a miss hit occurred to the FSA cache table TA), the access count values of all the cache lines of the FSA cache table TA are decremented by 1 at once.

In the case where a miss hit occurred to the cache section 15 when the DM cache table TB has no invalid cache line corresponding to the index and the FSA cache table TA has one or more invalid cache lines, data (data and the tag #2) which has been stored in the miss hit cache line of the DM cache table TB is transferred to one of invalid cache lines of the FSA cache table TA. Data fetched from the main memory 21 (or the secondary cache memory 20) due to the miss hit of the cache section 15 is written into the cache line of the DM cache table TB from which data (data and the tag #2) has been transferred to the FSA cache table TA.

In the case where a miss hit occurred to the cache section 15 when the DM cache table TB has no invalid cache line corresponding to the index and the FSA cache table TA is full of valid cache lines, the data (data and the tag #2) which has been stored in the miss hit cache line of the DM cache table TB is transferred to one of cache lines of the FSA cache table TA having the smallest access count value. Preferably, a least recently used cache line (whose recent cache hit occurred the oldest) is selected from the smallest-access-count cache lines, and the selected least recently used cache line is designated as the destination of the data transfer from the DM cache table TB to the FSA cache table TA. Data fetched from the main memory 21 (or the secondary cache memory 20) due to the miss hit of the cache section 15 is written into the cache line of the DM cache table TB from which data (data and the tag #2) has been transferred to the FSA cache table TA.

In the case where a miss hit occurred to the cache section 15 when the DM cache table TB has an invalid cache line corresponding to the index, data fetched from the main memory 21 (or the secondary cache memory 20) due to the miss hit of the cache section 15 is written into the invalid cache line of the DM cache table TB corresponding to the index.

By such data management/transfer, update of cache lines of the FSA cache table TA is executed in consideration of the access count value (effective hit count) of each cache line, therefore, the capability of preserving high-hit-rate cache lines is improved in the FSA cache table TA and thereby the cache hit rate of the cache section 15 is increased. Further, duplication of data in the FSA cache table TA and the DM cache table TB is perfectly eliminated, that is, there is no case where particular data (the same data) is stored both in the FSA cache table TA and in the DM cache table TB. Thereby, memory space of the FSA cache table TA and the DM cache table TB can be used fully efficiently and the amount of cache data which can be stored in the cache section 15 of a limited data storage capacity can be increased to the maximum. Therefore, the cache hit rate of the cache section 15 is increased more efficiently and the number of access to the main memory 21 (or the secondary cache memory 20) is reduced to minimum, and thereby the reduction of the program execution time of the CPU 50 is attained in a very high level.

Figure 11:
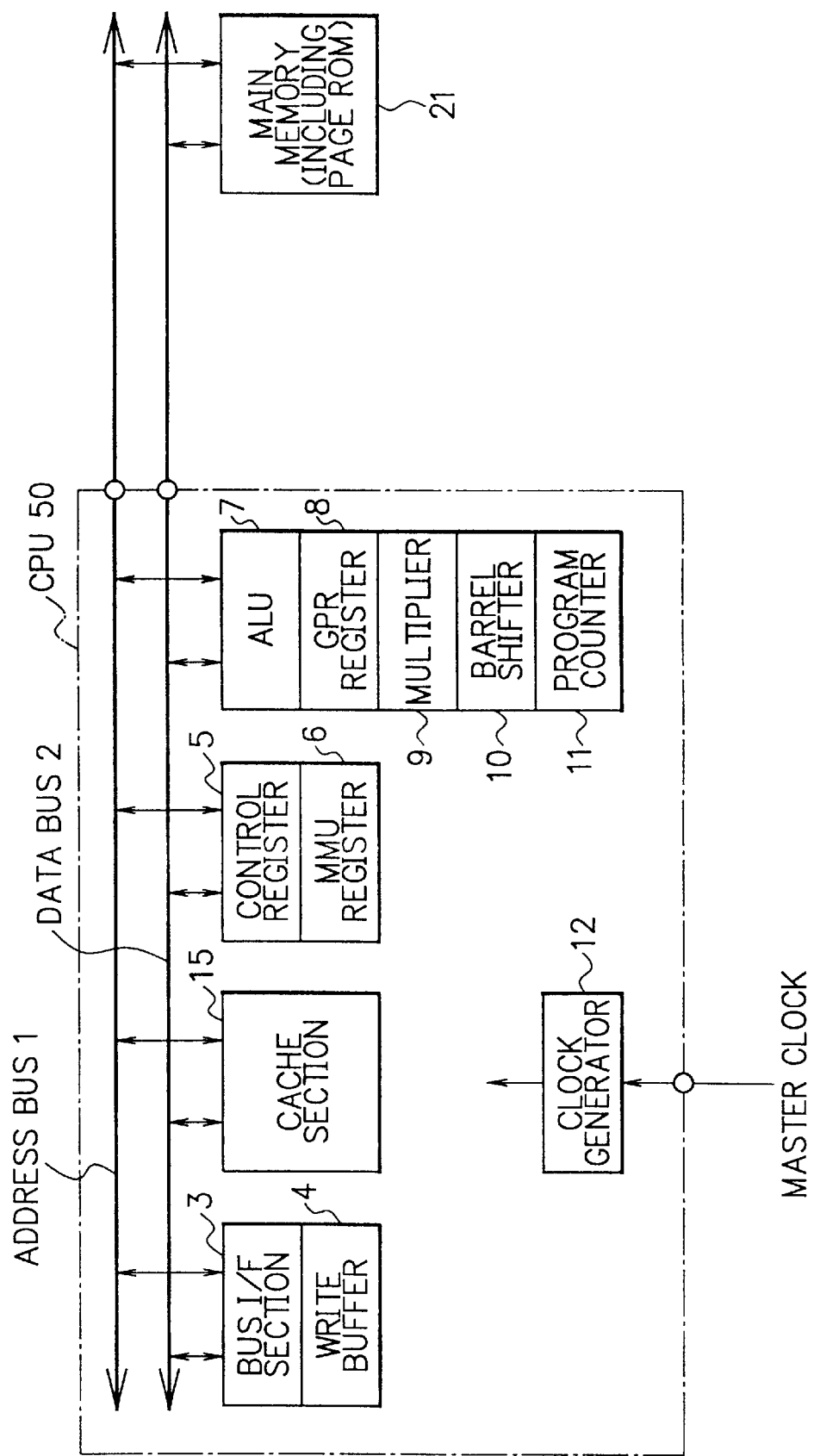
FIG. 11 is a block diagram showing another example of a cache system according to the present invention which is applied to a computer system.

Incidentally, while the cache system of the first embodiment included the secondary cache memory 20, the above effects of the first embodiment can be obtained even in the case where the cache system does not have the secondary cache memory 20 as shown in FIG. 11. By the addition of the secondary cache memory 20, the effects of the cache system can be enhanced.

FIG. 12 is a block diagram showing the composition of a cache section 15A of a cache system in accordance with a second embodiment of the present invention. The cache section 15A is employed in the second embodiment in place of the cache section 15 (FIG. 1) in the computer systems shown in FIG. 6 and FIG. 11. The FSA cache table TA in the cache section 15A of FIG. 12 is provided with access count areas AC of a larger size. Concretely, the size of the access count area AC 2 of each cache line of the FSA cache table TA is set at 16 bits, for example. The 16-bit access count area AC of the second embodiment can count from 0 up to 65535, while the 2-bit access count area AC of the first embodiment could count only up to 3.

In the second embodiment, the unshown access counter executes the management of the access count areas AC differently. When a cache hit occurred to a cache line of the FSA cache table TA, the unshown access counter increments the access count value of the cache line by 1, in the same way as the first embodiment. However, the unshown access counter of the second embodiment does not execute the simultaneous decrement (−1) of the access count values of all the cache lines of the FSA cache table TA even when a miss hit occurred to the cache section 15A. Therefore, in the second embodiment, the access count values stored in the access count areas AC of the cache lines of the FSA cache table TA are incremented only.

Data transfer from the DM cache table TB to the FSA cache table TA is executed in the same way as the first embodiment, as follows. In the case where a miss hit occurred to the cache section 15A when the FSA cache table TA has one or more invalid cache lines, data (data and the tag #2) which has been stored in the miss hit cache line of the DM cache table TB is transferred to one of invalid cache lines of the FSA cache table TA. In the case where a miss hit occurred to the cache section 15A when the FSA cache table TA is full of valid cache lines, the data (data and the tag #2) which has been stored in the miss hit cache line of the DM cache table TB is transferred to one of cache lines having the smallest access count value.

In the first embodiment employing the 2-bit access count areas AC, the number of cache lines having the smallest access count value (such as "0") tends to be large, while the number is reduced in the second embodiment. Therefore, by the cache system according to the second embodiment of the present invention, the difference between the hit counts of the cache lines can be incorporated more directly in the process for preserving high-hit-rate (high-hit-count) cache lines in the FSA cache table TA.

FIG. 13 is a schematic diagram showing a 4-way set associative cache table TC which is employed as a non-full-set associative cash table in a cache section 15B of a cache system in accordance with a third embodiment of the present invention. While the DM (Direct Mapping) cache table TB was employed as the non-full-set associative cash table of the cache section (15, 15A) in the first and second embodiments, the cache section 15B of the third embodiment employs the 4-way set associative cache table TC of FIG. 13 as the non-full-set associative cash table to be coupled with the full-set associative (FSA) cash table TA.

Referring to FIG. 13, the 4-way set associative cache table TC has four cache lines corresponding to an index. Each of the four cache lines corresponding to an index has three areas for storing a valid bit V2, a tag #2 and data, similarly to the DM cache table TB of the first and second embodiments. On the left-hand end of each line composed of the four cache lines, an LRU area for storing a value LRU (least recently used) is provided. The LRU value is used for indicating a least recently used cache line (whose recent cache hit occurred the oldest) in the four cache lines corresponding to a particular index. The size of the LRU area is set at 2 bits for example so as to be able to indicate the four cache lines.

While the DM cache table TB could store only one piece of data (corresponding to only one tag #2) with respect to one index, the 4-way set associative cache table TC can store four pieces of data (corresponding to four tags #2) with respect to one index, therefore, the cache hit rate of the 4-way set associative cache table TC is higher than that of the DM cache table TB.

In the following, the operations of the FSA cache table TA and the 4-way set associative cache table TC of the cache section 15B of the cache system of the third embodiment will be explained in detail. Incidentally, the tag comparison for the judgment on the cache hit is executed in the 4-way set associative cache table TC using the index and the tag #2 extracted from the input address data, similarly to the case of the DM cache table TB. Four tag comparisons are executed simultaneously in the 4-way set associative cache table TC with respect to a piece of input address data (with respect to one index and one tag #2 extracted from the input address data). The operation of the cache system of the third embodiment other than the following description is almost the same as that of the cache system of the first embodiment.

In initialization (when the computer system is reset or turned ON), all the cache lines of the FSA cache table TA and the 4-way set associative cache table TC are set invalid, that is, the valid bits V1 and V2 of the cache lines are set to "0". Thereafter, when data is written or transferred into a cache line of the FSA cache table TA or 4-way set associative cache table TC, the cache line is turned valid, that is, the valid bit V1 or V2 of the cache line is turned from "0" to "1".

The number of access to each cache line of the FSA cache table TA (access count value) is stored in the access count area AC of each cache line. When a cache hit occurred to a cache line of the FSA cache table TA, the access count value of the cache line is incremented by 1. When a miss hit occurred to the cache section 15B (or when a miss hit occurred to the FSA cache table TA), the access count values of all the cache lines of the FSA cache table TA are decremented by 1 at once.

In the case where a miss hit occurred to the cache section 15B (i.e. in the case where miss hits occurred to the FSA cache table TA and to four cache lines of the 4-way set associative cache table TC corresponding to the index of the input address data) when the 4-way set associative cache table TC has no invalid cache line corresponding to the index and the FSA cache table TA has one or more invalid cache lines, data (data and the tag #2) which has been stored in one of the four miss hit cache lines of the 4-way set associative cache table TC is transferred to one of invalid cache lines of the FSA cache table TA. The selection from the four miss hit cache lines is executed based on the LRU value which is stored in the LRU area of the line corresponding to the index. One of the four miss hit cache lines designated by the LRU is selected as the sender of the data transfer from the 4-way set associative cache table TC to the FSA cache table TA. Data fetched from the main memory 21 or the secondary cache memory 20 due to the miss hit of the cache section 15B is written into the selected cache line of the 4-way set associative cache table TC from which data (data and the tag #2) has been transferred to the FSA cache table TA.

In the case where a miss hit occurred to the cache section 15B when the 4-way set associative cache table TC has no invalid cache line corresponding to the index and the FSA cache table TA is full of valid cache lines, the data (data and the tag #2) which has been stored in one of the four miss hit cache lines of the 4-way set associative cache table TC designated by the LRU is transferred to one of cache lines of the FSA cache table TA having the smallest access count value. The destination of the data transfer can be selected randomly from the smallest-access-count cache lines. However, it is also possible to select a least recently used cache line (whose recent cache hit occurred the oldest) from the smallest-access-count cache lines and regard the least recently used cache line as the destination. Such selection of the least recently used cache line can be implemented by providing an area for storing access date/time to each cache line of the FSA cache table TA, for example. Data fetched from the main memory 21 or the secondary cache memory 20 due to the miss hit of the cache section 15B is written into the cache line of the 4-way set associative cache table TC from which data (data and the tag #2) has been transferred to the FSA cache table TA.

In the case where a miss hit occurred to the cache section 15B when the 4-way set associative cache table TC has one or more invalid cache lines corresponding to the index, data fetched from the main memory 21 or the secondary cache memory 20 due to the miss hit of the cache section 15B is written into one of the invalid cache lines of the 4-way set associative cache table TC corresponding to the index.

As described above, by the cache system according to the third embodiment of the present invention, in addition to the effects of the first embodiment, the cache hit rate of the non-full-set associative cash table can be increased by use of the 4-way set associative cache table TC, thereby a further improved cache hit rate is realized in the cache section 15B. The 4-way set associative cache table TC can increase the cache hit rate especially when a program having many branches is executed by the CPU 50, that is, when many instructions corresponding to the same index are executed by the CPU 50. Therefore, the cache system of the third embodiment is suitable for a computer system for executing complex programs having many branches.

Incidentally, while 4-way set associative cache memory has been employed in the third embodiment as non-full-set associative cash memory to be coupled with the full-set associative (FSA) cash memory, it is also possible to employ 2-way set associative cache memory, 8-way set associative cache memory, etc. as the non-full-set associative cash memory.

Further, it is also possible to provide the large-size access count areas AC to the cache lines of the FSA cache table TA and let the unshown access counter operate as in the second embodiment, thereby the effect of the second embodiment can also be obtained.

Incidentally, while the initial value of the access count value which is stored in the access count area AC of each cache line of the FSA cache table TA was assumed to be "0" in the first and third embodiments, the initial value is not limited to "0" and can also be set at a larger value so as to prevent the access count values from converging on "0". In such cases, the size of the access count area AC is set larger than in the first and third embodiments.

As set forth hereinabove, in the cache system and the cache processing method according to the present invention, a non-FSA (Full-Set Associative) cash table (TB, TC) such as a DM (Direct Mapping) cache table TB is coupled with an FSA cache table TA. Tag comparison for cache hit judgment is executed simultaneously in the two cache tables. The number of cache hits which occurred to each cache line of the FSA cache table TA is counted by the unshown access counter, and the access count value concerning the cache hit count is stored in the access count area AC of each cache line. For example, when a cache hit occurred to a cache line of the FSA cache table TA, the access count value of the cache line is incremented by 1, and when a miss hit occurred to both cache tables, the access count values of all the cache lines of the FSA cache table TA are decremented by 1 at once.

Data management/transfer is executed using the above access count values so as to increase the cache hit rate of the cache system including the FSA cache table TA and the non-FSA cash table (TB, TC). For example, in the first embodiment, if miss hits occurred to both cache tables TA and TB when the DM cache table TB has an invalid cache line corresponding to the index of the input address data, data fetched from main memory 21 (or the secondary cache memory 20) due to the miss hits is written into the invalid cache line of the DM cache table TB corresponding to the index. If the miss hits occurred when the DM cache table TB has no invalid cache line corresponding to the index and the FSA cache table TA has one or more invalid cache lines, data which has been stored in the miss hit cache line of the DM cache table TB is transferred to one of invalid cache lines of the FSA cache table TA, and data fetched from the main memory 21 (or the secondary cache memory 20) is written into the miss hit cache line of the DM cache table TB. If the miss hits occurred when the DM cache table TB has no invalid cache line corresponding to the index and the FSA cache table TA is full of valid cache lines, data which has been stored in the miss hit cache line of the DM cache table TB is transferred to one of cache lines of the FSA cache table TA having the smallest access count value, and data fetched from the main memory 21 (or the secondary cache memory 20) is written into the miss hit cache line of the DM cache table (TB).

By such data management/transfer using the access count values (cache hit count values), the capability of the FSA cache table TA for preserving high-hit-rate cache lines is improved and thereby the cache hit rate is increased. Duplication of the same data in the FSA cache table TA and the non-FSA cash table (TB, TC) is perfectly eliminated, and thereby usage efficiency of the memory space of the cache system is improved to the maximum and the cache hit rate is increased to a higher level. Therefore, the cache hit rate and data access speed can be increased to higher levels.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A cache system for decreasing the number of access of a data processing unit to external memory comprising:

full-set associative cash memory capable of preserving cache lines of high cache hit rates, in which when a first tag extracted from input address data matched one of first tags which have been stored in valid cache lines of the full-set associative cash memory, data which has been stored in a valid cache line corresponding to the matched first tag is read by the data processing unit as cache data;

non-full-set associative cash memory which is provided to the cache system so as to be coupled with the full-set associative cash memory and to execute tag comparison for the judgment on the cache hit simultaneously with the full-set associative cash memory, in which when a second tag extracted from the input address data matched a second tag which has been stored in a valid cache line of the non-full-set associative cash memory corresponding to an index extracted from the input address data, data which has been stored in the valid cache line corresponding to the matched second tag is read by the data processing unit as cache data;

cache hit count storage means each of which is provided corresponding to each of the cache lines of the full-set associative cash memory for storing a cache hit count value concerning the number of cache hits which occurred to the cache line; and a cache hit count management means for counting the number of cache hits in each cache line of the full-set associative cash memory and thereby managing and updating the cache hit count values which are stored in the cache hit count storage means, wherein:

if miss hits occurred to both the full-set associative cash memory and the non-full-set associative cash memory when the non-full-set associative cash memory has no invalid cache line corresponding to the index and the full-set associative cash memory has one or more invalid cache lines, data which has been stored in a valid cache line of the non-full-set associative cash memory corresponding to the index to which the miss hit occurred is transferred to one of the invalid cache lines of the full-set associative cash memory, and data fetched from the external memory due to the miss hits is written into the cache line of the non-full-set associative cash memory from which data has been transferred to the full-set associative cash memory, if miss hits occurred to both the full-set associative cash memory and the non-full-set associative cash memory when the non-full-set associative cash memory has no invalid cache line corresponding to the index and the full-set associative cash memory is full of valid cache lines, data which has been stored in a valid cache line of the non-full-set associative cash memory corresponding to the index to which the miss hit occurred is transferred to one of valid cache lines of the full-set associative cash memory having the smallest cache hit count value, and data fetched from the external memory due to the miss hits is written into the cache line of the non-full-set associative cash memory from which data has been transferred to the full-set associative cash memory, and if miss hits occurred to both the full-set associative cash memory and the non-full-set associative cash memory when the non-full-set associative cash memory has an invalid cache line corresponding to the index, data fetched from the external memory due to the miss hits is written into an invalid cache line of the non-full-set associative cash memory corresponding to the index.

2. A cache system as claimed in claim 1, wherein:

when a cache hit occurred to a cache line of the full-set associative cash memory, the cache hit count management means increments the cache hit count value of the cache line by 1, and when miss hits occurred to both the full-set associative cash memory and the non-full-set associative cash memory, the cache hit count management means decrements the cache hit count values of all the cache lines of the full-set associative cash memory by 1 at once.

3. A cache system as claimed in claim 1, wherein:

when a cache hit occurred to a cache line of the full-set associative cash memory, the cache hit count management means increments the cache hit count value of the cache line by 1, and when a miss hit occurred to the full-set associative cash memory, the cache hit count management means decrements the cache hit count values of all the cache lines of the full-set associative cash memory by 1 at once.

4. A cache system as claimed in claim 1, wherein:

when a cache hit occurred to a cache line of the full-set associative cash memory, the cache hit count management means increments the cache hit count value of the cache line by 1.

5. A cache system as claimed in claim 1, further comprising cache hit date/time storage means each of which is provided corresponding to each of the cache lines of the full-set associative cash memory for storing data concerning the date and time of a recent cache hit which occurred to the cache line, wherein:

in the case where miss hits occurred to both the full-set associative cash memory and the non-full-set associative cash memory when the non-full-set associative cash memory has no invalid cache line corresponding to the index and the full-set associative cash memory is full of valid cache lines, a least recently used cache line is selected from the valid cache lines of the full-set associative cash memory having the smallest cache hit count value based on the data stored in the cache hit date/time storage means, and the selected least recently used cache line is designated as the destination of the data transfer from the non-full-set associative cash memory to the full-set associative cash memory.

6. A cache system as claimed in claim 1, wherein direct mapping cache memory is employed as the non-full-set associative cash memory.

7. A cache system as claimed in claim 1, wherein N-way set associative cache memory (N=2, 4, 8, ...) is employed as the non-full-set associative cash memory.

8. A cache system as claimed in claim 7, further comprising LRU storage means each of which is provided corresponding to each index for storing an LRU (least recently used) value for indicating a least recently used one of the N cache lines corresponding to the index, wherein:

in the case where miss hits occurred to both the full-set associative cash memory and the N-way set associative cache memory when the N-way set associative cache memory has no invalid cache line corresponding to the index and the full-set associative cash memory has one or more invalid cache lines, a cache line designated by the LRU value is selected from the N miss hit cache lines of the N-way set associative cache table and data which has been stored in the selected cache line is transferred to one of invalid cache lines of the full-set associative cash memory, and data fetched from the external memory due to the miss hits is written into the selected cache line of the N-way set associative cache table from which data has been transferred to the full-set associative cash memory, in the case where miss hits occurred to both the full-set associative cash memory and the N-way set associative cache memory when the N-way set associative cache memory has no invalid cache line corresponding to the index and the full-set associative cash memory is full of valid cache lines, a cache line designated by the LRU value is selected from the N miss hit cache lines of the N-way set associative cache table and data which has been stored in the selected cache line is transferred to one of valid cache lines of the full-set associative cash memory having the smallest cache hit count value, and data fetched from the external memory due to the miss hits is written into the selected cache line of the N-way set associative cache table from which data has been transferred to the full-set associative cash memory, and in the case where miss hits occurred to both the full-set associative cash memory and the N-way set associative cache memory when the N-way set associative cache memory has one or more invalid cache lines corresponding to the index, data fetched from the external memory due to the miss hits is written into one of the invalid cache lines of the N-way set associative cache memory corresponding to the index.

9. A cache system as claimed in claim 8, further comprising cache hit date/time storage means each of which is provided corresponding to each of the cache lines of the full-set associative cash memory for storing data concerning the date and time of a recent cache hit which occurred to the cache line, wherein:

in the case where miss hits occurred to both the full-set associative cash memory and the N-way set associative cache memory when the N-way set associative cache memory has no invalid cache line corresponding to the index and the full-set associative cash memory is full of valid cache lines, a least recently used cache line is selected from the valid cache lines of the full-set associative cash memory having the smallest cache hit count value based on the data stored in the cache hit date/time storage means, and the selected least recently used cache line is designated as the destination of the data transfer from the N-way set associative cache memory to the full-set associative cash memory.

10. A cache system as claimed in claim 1, further comprising secondary cache memory which is provided in addition to primary cache memory composed of the full-set associative cash memory and the non-full-set associative cash memory.

11. A cache processing method for decreasing the number of access of a data processing unit to external memory employing a combination of full-set associative cash memory capable of preserving high-hit-rate cache lines and non-full-set associative cash memory which executes tag comparison for the judgment on the cache hit simultaneously with the full-set associative cash memory, comprising the steps of:

a first tag comparison step in which a first tag extracted from input address data is compared with first tags which have been stored in valid cache lines of the full-set associative cash memory and it is judged that a cache hit occurred to the full-set associative cash memory if the extracted first tag matched one of the stored first tags;

a second tag comparison step which is executed simultaneously with the first tag comparison step, in which a second tag extracted from the input address data is compared with one or more second tags which have been stored in one or more valid cache lines of the non-full-set associative cash memory corresponding to an index extracted from the input address data and it is judged that a cache hit occurred to the non-full-set associative cash memory if the extracted second tag matched one of the stored second tags corresponding to the index;

a cache hit count management step in which the number of cache hits which occurred to each cache line of the full-set associative cash memory is counted and thereby cache hit count values with respect to the cache lines of the full-set associative cash memory which are stored in cache hit count storage means corresponding to the cache lines are updated;

a first cache data reading process in which if a cache hit occurred to the full-set associative cash memory in the first tag comparison step, data which has been stored in a valid cache line of the full-set associative cash memory corresponding to the matched first tag is read by the data processing unit as cache data;

a second cache data reading process in which if a cache hit occurred to the non-full-set associative cash memory in the second tag comparison step, data which has been stored in a valid cache line of the non-full-set associative cash memory corresponding to the index and the matched second tag is read by the data processing unit as cache data;

a first data transfer step in which if miss hits occurred to both the full-set associative cash memory and the non-full-set associative cash memory when the non-full-set associative cash memory has no invalid cache line corresponding to the index and the full-set associative cash memory has one or more invalid cache lines, data which has been stored in a valid cache line of the non-full-set associative cash memory corresponding to the index to which the miss hit occurred is transferred to one of the invalid cache lines of the full-set associative cash memory, and data fetched from the external memory due to the miss hits is written into the cache line of the non-full-set associative cash memory from which data has been transferred to the full-set associative cash memory;

a second data transfer step in which if miss hits occurred to both the full-set associative cash memory and the non-full-set associative cash memory when the non-full-set associative cash memory has no invalid cache line corresponding to the index and the full-set associative cash memory is full of valid cache lines, the data which has been stored in a valid cache line of the non-full-set associative cash memory corresponding to the index to which the miss hit occurred is transferred to one of valid cache lines of the full-set associative cash memory having the smallest cache hit count value, and data fetched from the external memory due to the miss hits is written into the cache line of the non-full-set associative cash memory from which data has been transferred to the full-set associative cash memory; and a third data transfer step in which if miss hits occurred to both the full-set associative cash memory and the non-full-set associative cash memory when the non-full-set associative cash memory has an invalid cache line corresponding to the index, data fetched from the external memory due to the miss hits is written into an invalid cache line of the non-full-set associative cash memory corresponding to the index.

12. A cache processing method as claimed in claim 11, wherein in the cache hit count management step:
   when a cache hit occurred to a cache line of the full-set associative cash memory, the cache hit count value of the cache line is incremented by 1, and
   when miss hits occurred to both the full-set associative cash memory and the non-full-set associative cash memory, the cache hit count values of all the cache lines of the full-set associative cash memory are decremented by 1 at once.

13. A cache processing method as claimed in claim 11, wherein in the cache hit count management step:
   when a cache hit occurred to a cache line of the full-set associative cash memory, the cache hit count value of the cache line is incremented by 1, and
   when a miss hit occurred to the full-set associative cash memory, the cache hit count values of all the cache lines of the full-set associative cash memory are decremented by 1 at once.

14. A cache processing method as claimed in claim 11, wherein in the cache hit count management step:
   when a cache hit occurred to a cache line of the full-set associative cash memory, the cache hit count value of the cache line is incremented by 1.

15. A cache processing method as claimed in claim 11, further comprising a cache hit date/time storage step in which data concerning the date and time of a recent cache hit which occurred to a cache line of the full-set associative cash memory is stored in a cache hit date/time storage means which is provided corresponding to the cache line, wherein in the second data transfer step:
   a least recently used cache line is selected from the valid cache lines of the full-set associative cash memory having the smallest cache hit count value based on the data stored in the cache hit date/time storage means, and the selected least recently used cache line is designated as the destination of the data transfer from the non-full-set associative cash memory to the full-set associative cash memory.

16. A cache processing method as claimed in claim 11, wherein direct mapping cache memory is employed as the non-full-set associative cash memory.

17. A cache processing method as claimed in claim 11, wherein N-way set associative cache memory (N=2, 4, 8, . . . ) is employed as the non-full-set associative cash memory.

18. A cache processing method as claimed in claim 17, further comprising an LRU storage step in which an LRU (least recently used) value for indicating a least recently used one of the N cache lines of the N-way set associative cache memory corresponding to an index is stored in an LRU storage means which is provided corresponding to the index, wherein:
   in the first data transfer step, a cache line designated by the LRU value is selected from the N miss hit cache lines of the N-way set associative cache table and data which has been stored in the selected cache line is transferred to one of invalid cache lines of the full-set associative cash memory, and data fetched from the external memory due to the miss hits is written into the selected cache line of the N-way set associative cache table from which data has been transferred to the full-set associative cash memory,
   in the second data transfer step, a cache line designated by the LRU value is selected from the N miss hit cache lines of the N-way set associative cache table and data which has been stored in the selected cache line is transferred to one of valid cache lines of the full-set associative cash memory having the smallest cache hit count value, and data fetched from the external memory due to the miss hits is written into the selected cache line of the N-way set associative cache table from which data has been transferred to the full-set associative cash memory, and
   in the third data transfer step, data fetched from the external memory due to the miss hits is written into one of invalid cache lines of the N-way set associative cache memory corresponding to the index.

19. A cache processing method as claimed in claim 18, further comprising a cache hit date/time storage step in which data concerning the date and time of a recent cache hit which occurred to a cache line of the full-set associative cash memory is stored in a cache hit date/time storage means which is provided corresponding to the cache line, wherein in the second data transfer step:
   a least recently used cache line is selected from the valid cache lines of the full-set associative cash memory having the smallest cache hit count value based on the data stored in the cache hit date/time storage means, and the selected least recently used cache line is designated as the destination of the data transfer from the N-way set associative cache table to the full-set associative cash memory.

20. A cache processing method as claimed in claim 11, further comprising a secondary cache access step in which secondary cache memory, which is provided in addition to primary cache memory composed of the full-set associative cash memory and the non-full-set associative cash memory, is made access to in the case where miss hits occurred to both the full-set associative cash memory and the non-full-set associative cash memory.

21. A computer-readable record medium storing a program for instructing a computer to execute a cache process for decreasing the number of access of a data processing unit to external memory employing a combination of full-set associative cash memory capable of preserving high-hit-rate cache lines and non-full-set associative cash memory which executes tag comparison for the judgment on the cache hit simultaneously with the full-set associative cash memory, wherein the cache process comprises the steps of:
   a cache hit count management step in which the number of cache hits which occurred to each cache line of the full-set associative cash memory is counted and thereby cache hit count values with respect to the cache lines of the full-set associative cash memory which are stored in cache hit count storage means corresponding to the cache lines are updated;
   a first cache data reading process in which if a cache hit occurred to the full-set associative cash memory, data which has been stored in a valid cache line of the full-set associative cash memory to which the cache hit occurred is read by the data processing unit as cache data;
   a second cache data reading process in which if a cache hit occurred to the non-full-set associative cash memory, data which has been stored in a valid cache line of the non-full-set associative cash memory corresponding to the index to which the cache hit occurred is read by the data processing unit as cache data;

a first data transfer step in which if miss hits occurred to both the full-set associative cash memory and the non-full-set associative cash memory when the non-full-set associative cash memory has no invalid cache line corresponding to the index and the full-set associative cash memory has one or more invalid cache lines, data which has been stored in a valid cache line of the non-full-set associative cash memory corresponding to the index to which the miss hit occurred is transferred to one of the invalid cache lines of the full-set associative cash memory, and data fetched from the external memory due to the miss hits is written into the cache line of the non-full-set associative cash memory from which data has been transferred to the full-set associative cash memory;

a second data transfer step in which if miss hits occurred to both the full-set associative cash memory and the non-full-set associative cash memory when the non-full-set associative cash memory has no invalid cache line corresponding to the index and the full-set associative cash memory is full of valid cache lines, the data which has been stored in a valid cache line of the non-full-set associative cash memory corresponding to the index to which the miss hit occurred is transferred to one of valid cache lines of the full-set associative cash memory having the smallest cache hit count value, and data fetched from the external memory due to the miss hits is written into the cache line of the non-full-set associative cash memory from which data has been transferred to the full-set associative cash memory; and a third data transfer step in which if miss hits occurred to both the full-set associative cash memory and the non-full-set associative cash memory when the non-full-set associative cash memory has an invalid cache line corresponding to the index, data fetched from the external memory due to the miss hits is written into an invalid cache line of the non-full-set associative cash memory corresponding to the index.

22. A computer-readable record medium as claimed in claim 21, wherein in the cache hit count management step:

when a cache hit occurred to a cache line of the full-set associative cash memory, the cache hit count value of the cache line is incremented by 1, and when miss hits occurred to both the full-set associative cash memory and the non-full-set associative cash memory, the cache hit count values of all the cache lines of the full-set associative cash memory are decremented by 1 at once.

23. A computer-readable record medium as claimed in claim 21, wherein in the cache hit count management step:

when a cache hit occurred to a cache line of the full-set associative cash memory, the cache hit count value of the cache line is incremented by 1, and when a miss hit occurred to the full-set associative cash memory, the cache hit count values of all the cache lines of the full-set associative cash memory are decremented by 1 at once.

24. A computer-readable record medium as claimed in claim 21, wherein in the cache hit count management step:

when a cache hit occurred to a cache line of the full-set associative cash memory, the cache hit count value of the cache line is incremented by 1.

25. A computer-readable record medium as claimed in claim 21, wherein the cache process further comprises a cache hit date/time storage step in which data concerning the date and time of a recent cache hit which occurred to a cache line of the full-set associative cash memory is stored in a cache hit date/time storage means which is provided corresponding to the cache line, and in the second data transfer step, a least recently used cache line is selected from the valid cache lines of the full-set associative cash memory having the smallest cache hit count value based on the data stored in the cache hit date/time storage means, and the selected least recently used cache line is designated as the destination of the data transfer from the non-full-set associative cash memory to the full-set associative cash memory.

26. A computer-readable record medium as claimed in claim 21, wherein direct mapping cache memory is employed as the non-full-set associative cash memory.

27. A computer-readable record medium as claimed in claim 21, wherein N-way set associative cache memory (N=2, 4, 8, . . . ) is employed as the non-full-set associative cash memory.

28. A computer-readable record medium as claimed in claim 27, wherein the cache process further comprises an LRU storage step in which an LRU (least recently used) value for indicating a least recently used one of the N cache lines of the N-way set associative cache memory corresponding to an index is stored in an LRU storage means which is provided corresponding to the index, and in the first data transfer step, a cache line designated by the LRU value is selected from the N miss hit cache lines of the N-way set associative cache table and data which has been stored in the selected cache line is transferred to one of invalid cache lines of the full-set associative cash memory, and data fetched from the external memory due to the miss hits is written into the selected cache line of the N-way set associative cache table from which data has been transferred to the full-set associative cash memory, and in the second data transfer step, a cache line designated by the LRU value is selected from the N miss hit cache lines of the N-way set associative cache table and data which has been stored in the selected cache line is transferred to one of valid cache lines of the full-set associative cash memory having the smallest cache hit count value, and data fetched from the external memory due to the miss hits is written into the selected cache line of the N-way set associative cache table from which data has been transferred to the full-set associative cash memory, and in the third data transfer step, data fetched from the external memory due to the miss hits is written into one of invalid cache lines of the N-way set associative cache memory corresponding to the index.

29. A computer-readable record medium as claimed in claim 28, wherein the cache process further comprises a cache hit date/time storage step in which data concerning the date and time of a recent cache hit which occurred to a cache line of the full-set associative cash memory is stored in a cache hit date/time storage means which is provided corresponding to the cache line, and in the second data transfer step, a least recently used cache line is selected from the valid cache lines of the full-set associative cash memory having the smallest cache hit count value based on the data stored in the cache hit date/time storage means, and the selected least recently used cache line is designated as the destination of the data transfer from the N-way set associative cache table to the full-set associative cash memory.

30. A computer-readable record medium as claimed in claim 21, wherein the cache process further comprises a secondary cache access step in which secondary cache memory, which is provided in addition to primary cache memory composed of the full-set associative cash memory and the non-full-set associative cash memory, is made access to in the case where miss hits occurred to both the full-set associative cash memory and the non-full-set associative cash memory.

* * * * *